United States Patent
Kawashima

(10) Patent No.: US 10,236,680 B2
(45) Date of Patent: Mar. 19, 2019

(54) CONTROL CIRCUIT OF SWITCHING POWER SUPPLY DEVICE

(71) Applicant: FUJI ELECTRIC CO., LTD., Kawasaki-shi, Kanagawa (JP)

(72) Inventor: Tetsuya Kawashima, Matsumoto (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/661,568

(22) Filed: Jul. 27, 2017

(65) Prior Publication Data

US 2018/0062383 A1 Mar. 1, 2018

(30) Foreign Application Priority Data

Aug. 30, 2016 (JP) .................................. 2016-167850
Nov. 17, 2016 (JP) .................................. 2016-223748

(51) Int. Cl.
*H02M 3/335* (2006.01)
*H02M 3/337* (2006.01)
*H02H 7/12* (2006.01)
*H02M 1/32* (2007.01)
*H02M 1/00* (2006.01)

(52) U.S. Cl.
CPC ............ *H02H 7/1213* (2013.01); *H02M 1/32* (2013.01); *H02M 3/3376* (2013.01); *H02M 3/33515* (2013.01); *H02M 3/33523* (2013.01); *H02M 3/337* (2013.01); *H02M 2001/0058* (2013.01);
(Continued)

(58) Field of Classification Search
CPC ....... H02M 1/4241; H02M 2001/0003; H02M 2001/0009; H02M 2001/0058; H02M 3/156; H02M 3/335; H02M 3/33515; H02M 3/33523; H02M 3/337; H02M 7/4807; H02M 2007/4811; H02M 2007/4815; H02M 2007/4818; H02H 7/10; H02H 7/1213
See application file for complete search history.

(56) References Cited

U.S. PATENT DOCUMENTS 7,417,382 B2 * 8/2008 Lin ....................... H02M 7/523
  315/225
9,621,045 B2 * 4/2017 Tang .................. H02M 3/1584
(Continued)

FOREIGN PATENT DOCUMENTS

JP 2012-170218 A 9/2012
WO WO-2011/132275 A1 10/2011

*Primary Examiner* — Timothy J. Dole
*Assistant Examiner* — Shahzeb K Ahmad
(74) *Attorney, Agent, or Firm* — Rabin & Berdo, P.C.

(57) ABSTRACT

In a control circuit of a switching power supply device, a switching cycle generating unit controls a switching cycle in keeping with a signal of an error voltage detected on a secondary side to stabilize an output voltage at a target value. A load current for overload protection is estimated based on a value produced by integrating a resonant current at an integrator and averaging at an averaging calculation unit. Here, although the switching cycle is correlated to the ratio of input/output voltages, the switching cycle is negatively correlated to the input voltage because the output voltage is controlled so as to be constant. A correction calculating unit uses a signal that decides the switching cycle as information corresponding to the input voltage, which eliminates the need to detect the input voltage.

9 Claims, 19 Drawing Sheets

(52) U.S. Cl.
CPC ....... *Y02B 70/1433* (2013.01); *Y02B 70/1491* (2013.01)

(56) References Cited

U.S. PATENT DOCUMENTS

| | | | |
|---|---|---|---|
| 2010/0270989 A1* | 10/2010 | Sasaki | H02M 3/157 323/282 |
| 2011/0261592 A1 | 10/2011 | Samejima et al. | |
| 2013/0294118 A1* | 11/2013 | So | H02M 3/33507 363/21.16 |
| 2015/0035510 A1* | 2/2015 | Hoshino | H02M 3/157 323/283 |
| 2015/0198634 A1* | 7/2015 | Brinlee | G01R 31/28 324/72.5 |
| 2015/0207419 A1* | 7/2015 | Kyono | H02M 3/33507 363/17 |
| 2017/0126135 A1* | 5/2017 | Sugawara | H02M 1/08 |
| 2017/0133943 A1* | 5/2017 | Garrity | H02J 3/46 |

\* cited by examiner

CONTROL CIRCUIT OF SWITCHING POWER SUPPLY DEVICE

CROSS-REFERENCE TO RELATED APPLICATION

This application is based upon and claims the benefits of priority of the prior Japanese Patent Application No. 2016-167850, filed on Aug. 30, 2016, and the Japanese Patent Application No. 2016-223748, filed on Nov. 17, 2016, the entire contents of which are incorporated herein by reference.

BACKGROUND OF THE INVENTION

1. Field of the Invention

The embodiments discussed herein are related to a control circuit of a switching power supply device that includes a current resonance-type DC-DC converter to cope with a wide range of input voltages for worldwide compatibility.

2. Background of the Related Art

In a current resonance-type switching power supply device, control that has a target voltage outputted is performed by a control circuit disposed on the primary side of a transformer based on a signal fed back from the secondary side of the transformer. However, since there is no way to directly detect the load current, the control circuit detects the current on the primary side and estimates the load current on the secondary side. Here, when the estimated load current exceeds a current value set in advance, the current circuit performs an overload protection operation to protect the switching power supply device from an overload state.

Since the input voltage of a switching power supply device with worldwide compatibility is not constant, during an overcurrent protection operation, the control circuit performs control in keeping with the input voltage. That is, even in a state where the load current of the switching power supply device is the same, when the input voltage changes, the control circuit needs to change the threshold for overload protection in keeping with the input voltage. As one example, when the threshold for overload protection for the primary-side current is 2 A for an input voltage of 100V, the threshold for overload protection for the primary-side current is set at 1 A for an input voltage of 200V.

For this reason, the control circuit of a switching power supply device with worldwide compatibility needs information on the input voltage in order to change the threshold for overload protection. A typical way of acquiring information on the input voltage is to divide the input voltage and input a voltage into the control circuit (see, for example, Japanese Laid-open Patent Publication No. 2012-170218 (FIGS. 1, 2, and 5)).

According to Japanese Laid-open Patent Publication No. 2012-170218, the input voltage is divided so that information on the input voltage may be directly acquired, and by applying the acquired information on the input voltage to the detection current on the primary side inputted into an overload protection circuit ("estimated load information") or to threshold information, overload protection is performed in keeping with the input voltage. This means that with Japanese Laid-open Patent Publication No. 2012-170218, to detect the input voltage, a circuit for dividing the input voltage needs to be provided outside the control circuit. In addition, to input the divided input voltage, there is an increase in the number of package pins of the controller integrated circuit that forms the control circuit, which increases the cost of the controller integrated circuit.

On the other hand, a method of acquiring information on the input voltage without using a means that inputs the input voltage via a divider circuit and package pins of a controller IC is also known (see, for example, International Publication Pamphlet No. WO2011/132275 (FIG. 1)). In WO2011/132275, two switching elements are connected in series to construct a half-bridge circuit and information corresponding to the input voltage is acquired from a midpoint of the switching elements. This configuration makes use of the fact that a voltage which substantially corresponds to the input voltage is outputted at the midpoint of the two switching elements when the high-side switching element is on. The voltage outputted at the midpoint of the two switching elements is supplied, via an overcurrent protection diode and resistors for dividing voltage, to an input terminal that detects an overcurrent on the primary side of the controller integrated circuit. By doing so, since information corresponding to the detection current on the primary side includes information corresponding to the input voltage, correction may be performed while eliminating the dependency on the input voltage.

However, although using the voltage outputted at the midpoint of the two switching elements as information on the input voltage eliminates the need of providing the controller integrated circuit with a new terminal, it is difficult to perform correction accurately. Also, a diode for preventing back flow and resistors for dividing the voltage outside the control circuit are additionally needed.

SUMMARY OF THE INVENTION

According to an aspect, there is provided a control circuit of a current resonance-type switching power supply device, including: an overload protection unit configured to compare an estimated load current value found from a detected value of a resonant current with an overload set value, and output a signal that stops switching of a switching element when the estimated load current value exceeds the overload set value; and an analog-to-digital (A/D) converter configured to receive an error voltage between an output voltage and a target voltage and converts the error voltage to digital, wherein at the overload protection unit, one of the estimated load current value to be compared with the overload set value and the overload set value to be compared with the estimated load current value is corrected using an output signal of the A/D converter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 12A is a circuit diagram depicting an example configuration of the integrator and FIG. 12B depicts an example configuration of an integrating resistance circuit of the integrator.

FIG. 17A is a circuit diagram depicting an example configuration of the integrator and FIG. 17B depicts an example configuration of an integrating capacitance circuit of the integrator.

DETAILED DESCRIPTION OF THE INVENTION

Figure 1:
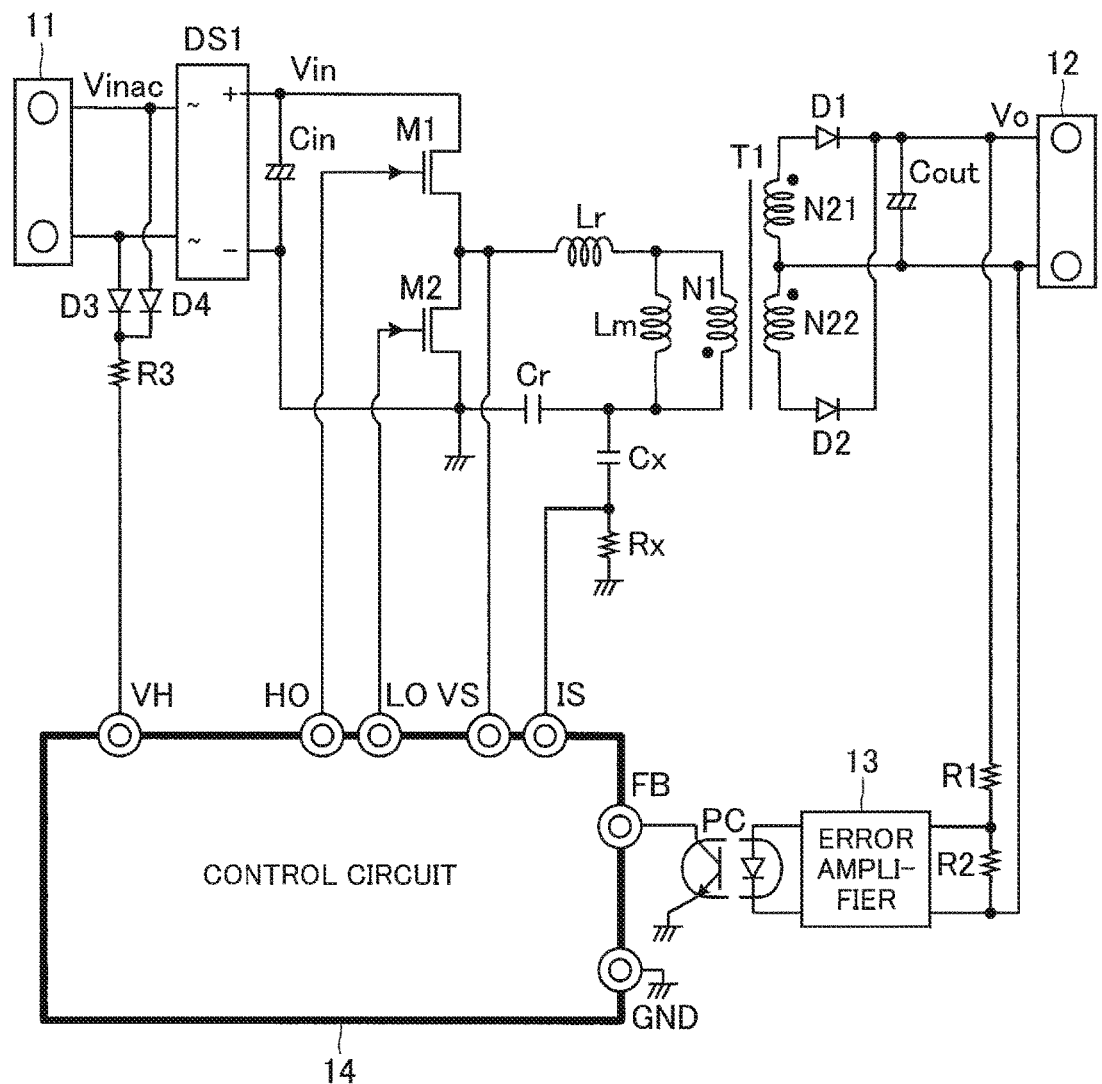
FIG. 1 depicts an example configuration of a current resonance-type converter that uses a control circuit of a switching power supply device according to the embodiments disclosed herein.

Several embodiments will be described below with reference to the accompanying drawings, wherein like reference numerals refer to like elements throughout. Note that in the following description, the same symbols are used for the names of terminals and the voltages, signals, and the like of the terminals. Also, when feasible, it is possible to implement a plurality of the following embodiments in combination.

Figure 2:
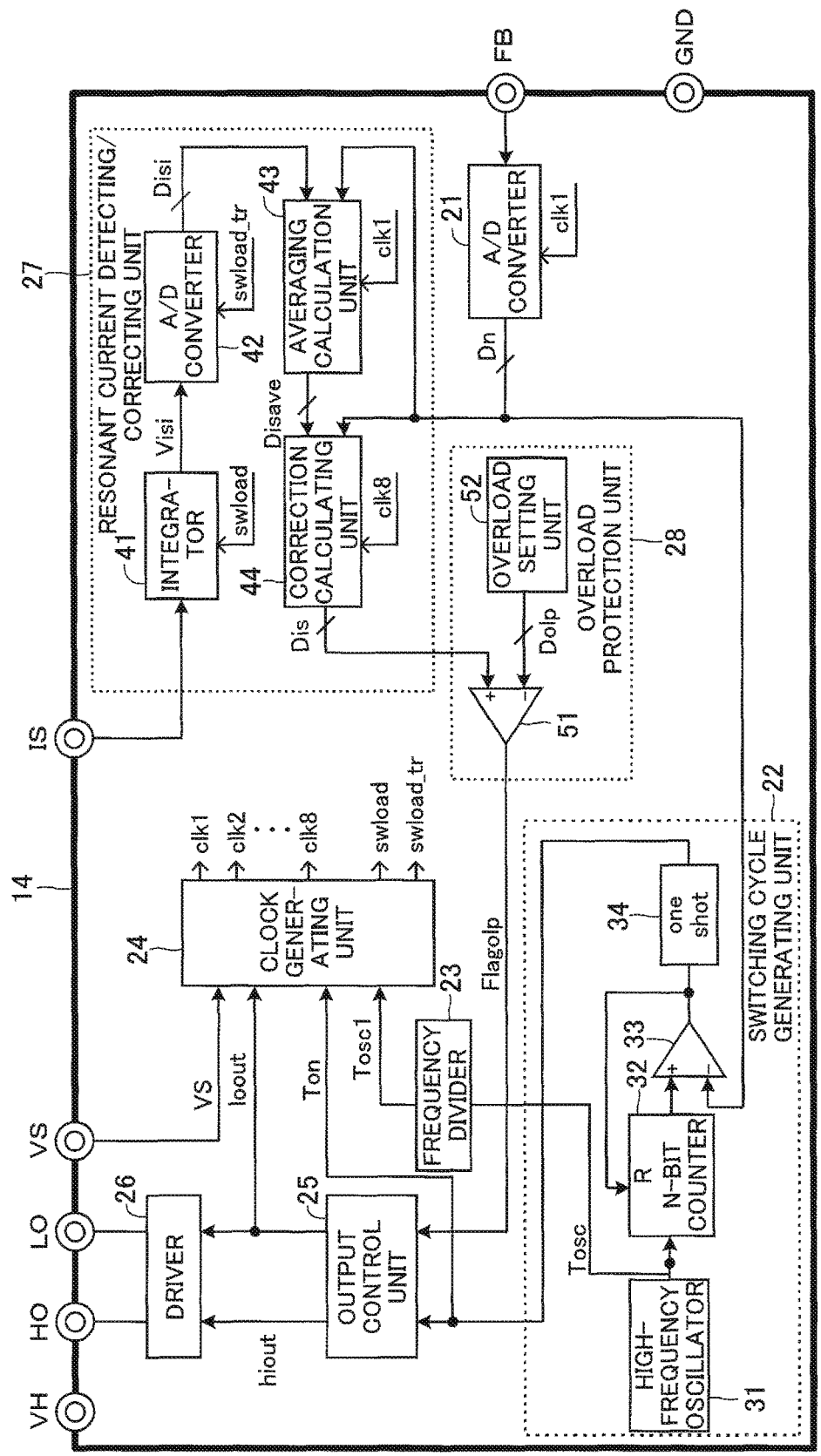
FIG. 2 depicts an example configuration of a control circuit of a switching power supply device according to a first embodiment.
Figure 3:
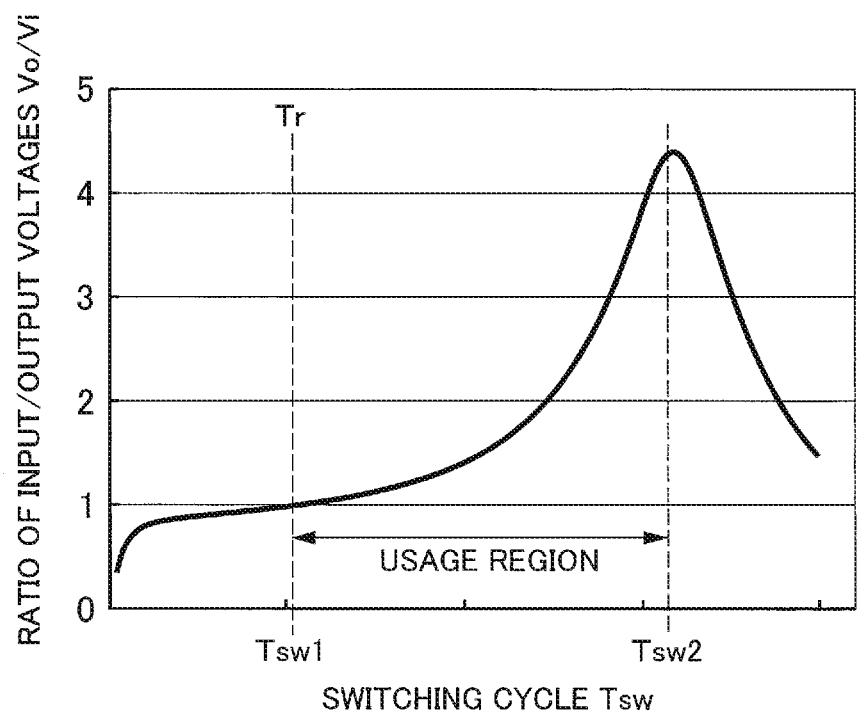
FIG. 3 depicts a relationship between a switching cycle and a ratio between input and output voltages for the first embodiment.

FIG. 1 depicts an example configuration of a current resonance-type converter that uses a control circuit of a switching power supply device according to the embodiments, FIG. 2 depicts an example configuration of a control circuit of a switching power supply device according to a first embodiment, and FIG. 3 depicts the relationship between a switching cycle and a ratio between input and output voltages for the first embodiment. In FIG. 3, the vertical axis represents the ratio between the input and output voltages Vo/Vi and the horizontal axis represents a switching cycle Tsw.

As depicted in FIG. 1, the current resonance-type converter has an input terminal 11 to which an AC input voltage Vinac is applied, with the input terminal 11 being connected to an AC input terminal of a bridge diode DS1. The positive electrode terminal of the bridge diode DS1 is connected to one terminal of an input capacitor Cin and the negative electrode terminal of the bridge diode DS1 is connected to the other terminal of the input capacitor Cin. With this configuration, the AC input voltage Vinac is full-wave rectified by the bridge diode DS1 and is smoothed by the input capacitor Cin to generate an input voltage Vin. The input capacitor Cin is connected in parallel to two switching elements M1 and M2 that form a half bridge circuit. Although MOSFETs (Metal-Oxide-Semiconductor Field-Effect Transistors) are used as the switching elements M1 and M2 in this example, it is also possible to use another type of power semiconductor element.

The switching element M2 is connected in parallel to a resonant inductance Lr, a magnetizing inductance Lm, and a resonant capacitor Cr, which are connected in series and form a resonance circuit. The magnetizing inductance Lm is connected in parallel to a primary winding N1 of a transformer T1. The transformer T1 also has two secondary windings N21 and N22 that are connected in series, and both ends of the secondary windings N21 and N22 are connected to anode terminals of two diodes D1 and D2.

The cathode terminals of the diodes D1 and D2 are interconnected and are also connected to one terminal of an output capacitor Cout and a positive electrode terminal of an output terminal 12. A center tap that is the shared connection terminal of the secondary windings N21 and N22 is connected to the other terminal of the output capacitor Cout and the negative electrode terminal of the output terminal 12. The output terminal 12 is connected to a load and supplies an output voltage Vo to the load.

Both ends of the output capacitor Cout are also connected to resistors R1 and R2 that are connected in series and are used to divide a voltage. The connection between the resistors R1 and R2 is connected to the input terminal of an error amplifier 13 and an output terminal of the error amplifier 13 is connected to a light-emitting diode of a photocoupler PC used as an insulating element. The collector terminal of the phototransistor of the photocoupler PC is connected to a terminal FB of a control circuit (control IC) 14, and the emitter terminal of the phototransistor is connected to ground. The error amplifier 13 detects the output voltage Vo and feeds a signal expressing the error between the output voltage Vo and an internal reference voltage back to the terminal FB of the control circuit 14. The control circuit 14 performs control based on the fed-back signal so that the output voltage Vo becomes constant. In the present embodiment, the fed-back signal is also used as information that expresses the input voltage.

The connection between the magnetizing inductance Lm of the resonance circuit and the resonant capacitor Cr is connected to one terminal of a series circuit composed of a shunt capacitor Cx and a detection resistor Rx. The connection between the shunt capacitor Cx and the detection resistor Rx is connected to a terminal IS of the control circuit 14. Here, a resonant current flowing in the resonance circuit is divided by the shunt capacitor Cx and a signal produced by conversion to a voltage by the detection resistor Rx is supplied to the terminal IS of the control circuit 14 as a signal that indirectly expresses the load current.

The control circuit 14 also has terminals VS, LO, HO, VH, and GND. A reference potential VS (the potential at the connection between the switching elements M1 and M2) on the high side of the half bridge circuit is inputted into the terminal VS. The terminal HO and the terminal LO are respectively connected to a gate terminal of the high-side switching element M1 and the low-side switching element M2, and are terminals from which signals that drive the switching elements M1 and M2 are outputted. The terminal VH is a terminal via which power is supplied to the control circuit 14 from when the power supply is turned on until the control circuit 14 starts a switching control operation. The anode terminals of the diodes D3 and D4 are connected to the input terminal 11, the cathode terminals of the diodes D3 and D4 are connected to each other and are connected to one terminal of the resistor R3, and the other terminal of the resistor R3 is connected to the terminal VH of the control circuit 14. With this configuration, a voltage produced by diodes D3 and D4 rectifying the AC input voltage Vinac is supplied via the resistor R3 to the terminal VH of the control circuit 14. The terminal GND is connected to ground on the primary side of the transformer T1. The connection between the input capacitor Cin, the resonant capacitor Cr, and the switching element M2, and the other end of a series circuit composed of the shunt capacitor Cx and the detection resistor Rx are also connected to ground on the primary side of the transformer T1.

With the above configuration, in the current resonance-type converter, the control circuit 14 disposed on the primary side of the transformer T1 controls the on/off cycle (switching cycle) of the switching elements M1 and M2 in accordance with the error voltage detected on the secondary side of the transformer T1 so that the output voltage Vo is stabilized at a target value. However, instead of acquiring information on the input voltage to be used in an overload protection operation from the input voltage, the control circuit 14 uses the signal FB which is correlated with the input voltage and thereby avoids dependency on the input voltage.

As depicted in FIG. 2, the control circuit is equipped with an analog-to-digital (A/D) converter 21, a switching cycle generating unit 22, a frequency divider 23, a clock generating unit 24, an output control unit 25, a driver 26, a resonant current detecting/correcting unit 27 and an overload protection unit 28.

The A/D converter 21 converts the analog signal FB inputted into the terminal FB to a digital signal Dn and outputs the digital signal Dn. The signal Dn is supplied to the switching cycle generating unit 22 to control the switching cycle of the switching elements M1 and M2 so that the output voltage Vo becomes constant.

The signal Dn is also supplied to the resonant current detecting/correcting unit 27. At the resonant current detecting/correcting unit 27, the signal Dn is used as information expressing the input voltage. That is, as depicted in FIG. 3, a current resonance-type converter performs a switching operation in the range of a usage region between a switching cycle Tsw1 that is the resonance cycle Tr where the ratio of the input/output voltages is 1 and a switching cycle Tsw2 where the ratio of the input/output voltages reaches a maximum value. As indicated in the graph depicting the relationship between the ratio of the input/output voltages and the switching cycle, as the ratio of the input/output voltages (Vo/Vi) increases, the switching cycle increases (i.e., the switching frequency falls). Here, since the output voltage Vo is controlled so as to become constant, the input voltage Vi and the switching cycle are in a one-to-one relationship. Accordingly, the signal Dn that decides the switching cycle includes information on the input voltage Vi and is used at the resonant current detecting/correcting unit 27 as a signal for correcting the detection value of the resonant current in keeping with the input voltage Vi.

The switching cycle generating unit 22 includes a high-frequency oscillator 31, an N-bit counter 32, a comparator (digital comparator) 33, and a one-shot circuit 34 and generates a pulse signal with a cycle in keeping with the value of the signal Dn. The high-frequency oscillator 31 generates and outputs a signal Tosc that is a rectangular wave with a fixed cycle. The generated signal Tosc is supplied to the N-bit counter 32 and is also supplied to the frequency divider 23. The output terminal of the N-bit counter 32 is connected to a non-inverting input terminal of the comparator 33. The inverting input terminal of the comparator is connected to the output terminal of the A/D converter 21 and the output terminal of the comparator 33 is connected to a reset input terminal R of the N-bit counter 32 and to the input terminal of the one-shot circuit 34. The output terminal of the one-shot circuit 34 is connected to the output control unit 25 and an input terminal of the clock generating unit 24 so that a signal Ton is supplied to the output control unit 25 and the clock generating unit 24. By doing so, the N-bit counter counts the signals Tosc generated at the high-frequency oscillator 31 and when the counted value matches the signal Dn outputted by the A/D converter 21, the comparator 33 triggers the one-shot circuit 34. The one-shot circuit 34 outputs the signal Ton when triggered. The comparator 33 resets the count value of the N-bit counter 32 at the timing where the one-shot circuit 34 is triggered.

The frequency divider 23 receives the signal Tosc from the high-frequency oscillator 31 and outputs a signal Toscl produced by division. The output terminal of the frequency divider 23 is connected to the clock generating unit 24, so that the frequency divider 23 supplies the signal Tosc1 to the clock generating unit 24.

In addition to the switching cycle generating unit 22 and the output terminal of the frequency divider 23, the clock generating unit 24 is connected to the low-side output terminal of the output control unit 25 and the terminal VS. The clock generating unit 24 is supplied with the signal loout from the output control unit 25 and is also supplied with the high-side reference voltage VS from the terminal VS. The clock generating unit 24 generates clock signals clk1 to clk8 to be used by the A/D converter 21 and the resonant current detecting/correcting unit 27, the signal swload, and the swload_tr.

The output control unit 25 is connected to the switching cycle generating unit 22 and the output terminal of the overload protection unit 28. The output control unit 25 receives the signal Ton from the switching cycle generating unit 22 and outputs a signal hiout that drives the high-side switching element M1 and a signal loout that drives the low-side switching element M2. Here, a dead time is set for the signal hiout and the signal loout so that the switching elements M1 and M2 are not turned on at the same time. That is, at timing when the signal Ton from the switching cycle generating unit is inputted, out of the signals outputted from the terminals HO and LO, the output control unit 25 sets the signal, that was at a high (H) level at a low (L) level. In addition, the output control unit sets the signal, out of the signals outputted from the terminals HO and LO, that was at the L level at the H level at timing when a dead time set by an internal circuit that decides the dead time has elapsed. The output control unit 25 also has a function that stops the outputting of the signal hiout and the signal loout when a signal Flagolp expressing an overload state has been received from the overload protection unit 28.

The driver 26 receives the signal hiout and the signal loout outputted by the output control unit 25, generates gate signals that drive the switching elements M1 and M2, and supplies the generated gate signals to the terminal HO and the terminal LO.

The resonant current detecting/correcting unit 27 includes an integrator 41, an A/D converter 42, an averaging calculation unit 43, and a correction calculating unit 44. The integrator 41 has an input terminal that is connected to the terminal IS of the control circuit 14 and is supplied with the signal IS of a resonant current detected on the primary side. The integrator 41 is supplied with a signal swload from the clock generating unit 24 and integrates the signal IS for a period decided by the signal swload. The output terminal of the integrator 41 is connected to the input terminal of the A/D converter 42 and a signal Visi integrated by the integrator 41 is supplied to the A/D converter 42. When triggered by the signal swload_tr received from the clock generating unit 24, the A/D converter 42 fetches the signal Visi and converts the signal Visi to a digital signal Disi. The output terminal of the A/D converter 42 is connected to the input terminal of the averaging calculation unit 43. The averaging calculation unit 43 receives the signal Dn from the A/D converter 21, receives the clock signal clk1 from the clock generating unit 24, and starts a Disi/Dn division process at the timing of the clock signal clk1. By doing so, the averaging calculation unit 43 outputs a signal Disave produced by averaging the detected resonant current as an estimated load current value. The output terminal of the averaging calculation unit 43 is connected to the input terminal of the correction calculating unit 44. The correction calculating unit 44 receives the signal Dn from the A/D converter 21, receives the clock signal clk8 from the clock generating unit 24, and ends the correction process of the signal Disave using the signal Dn at the timing of the clock signal clk8. By doing so, at the averaging calculation unit 43 and the correction calculating unit 44, computation is executed in a period that is half the switching cycle, so that a signal Dis expressing the estimated load current value in keeping with the input current is outputted from the correction calculating unit 44. The signal Dis outputted by the correction calculating unit 44 is supplied to the overload protection unit 28.

The overload protection unit 28 includes a comparator 51 and an overload setting unit 52. The non-inverting input terminal of the comparator 51 receives the signal Dis from the correction calculating unit 44 and the inverting input terminal receives an overload setting signal Dolp from the overload setting unit 52. The comparator 51 outputs a signal Flagolp at the L level when the load current is in a normal range, but when the load current increases and an overload state where the signal Dis exceeds the overcurrent setting signal Dolp is reached, the comparator 51 outputs the signal Flagolp at the H level. When the comparator 51 has outputted the signal Flagolp at the H level, the output control unit 25 stops the supplying of the signals hiout and looout to the driver 26 to stop switching operations of the current resonance-type converter.

Next, specific examples of the clock generating unit 24 and the integrator 41 of the resonant current detecting/correcting unit 27 will be described.

Figure 4:
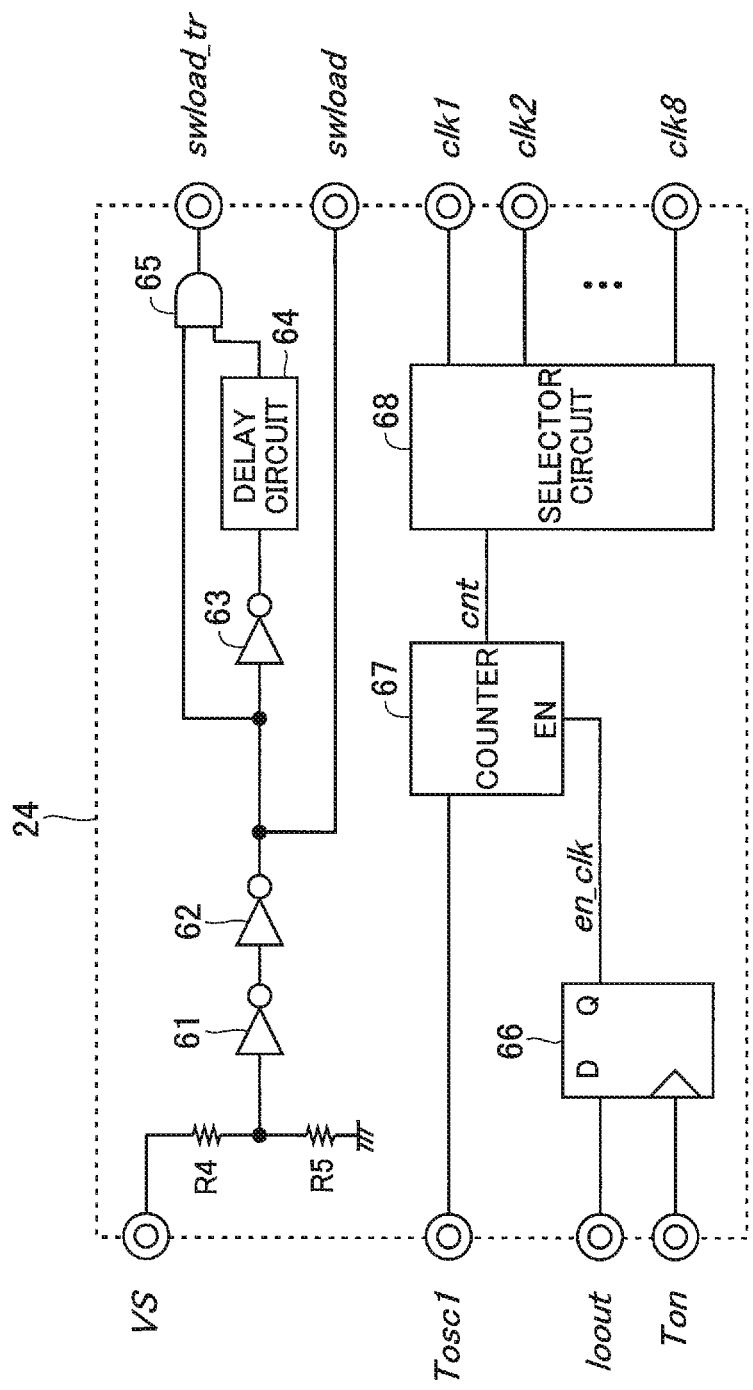
FIG. 4 is a circuit diagram depicting an example configuration of a clock generating unit.
Figure 5:
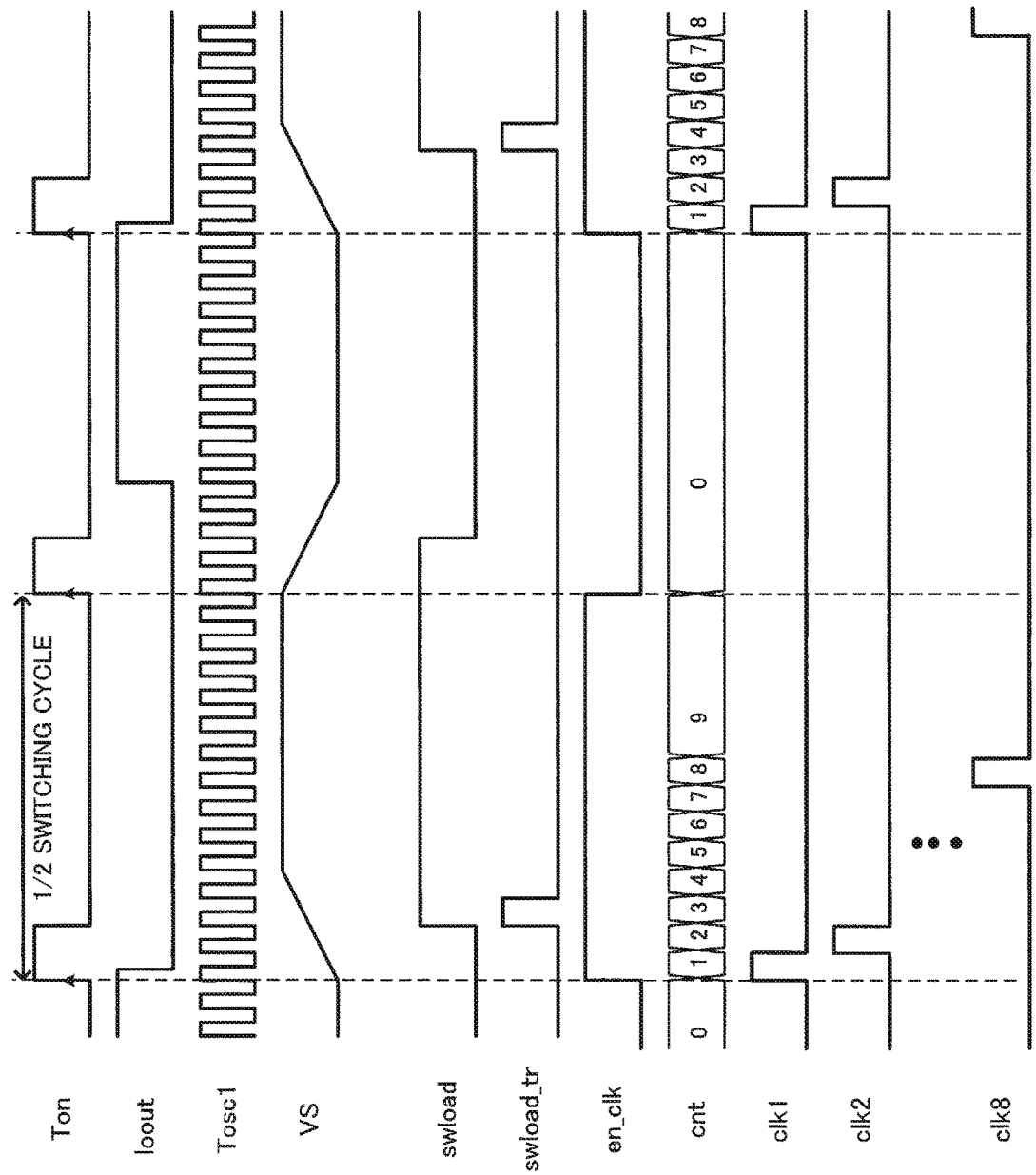
FIG. 5 is a timing chart depicting the operating waveforms of principal parts of the clock generating unit.

FIG. 4 is a circuit diagram depicting an example configuration of a clock generating unit and FIG. 5 is a timing chart depicting the operating waveforms of principal parts of the clock generating unit.

As depicted in FIG. 4, in the clock generating unit 24, resistors R4 and R5 that are connected in series are connected to the terminal VS that receives the high-side reference signal VS. The connection between the resistors R4 and R5 is connected to the input terminal of an inverter circuit 61 and the output terminal of the inverter circuit 61 is connected to the input terminal of an inverter circuit 62. The output terminal of the inverter circuit 62 is connected to a terminal swload, the input terminal of an inverter circuit 63, and one input terminal of an AND circuit 65. The output terminal of the inverter circuit 63 is connected to the input terminal of a delay circuit 64, the output terminal of the delay circuit 64 is connected to the other input terminal of the AND circuit 65, and the output terminal of the AND circuit 65 is connected to a terminal swload_tr.

The reference potential VS received by the terminal VS is divided by the resistors R4 and R5 and is subjected to waveform shaping by the inverter circuits 61 and 62. The resulting signal produced by waveform shaping is sent to the terminal swload and is outputted as the signal swload. That is, the signal swload is generated from the reference potential VS when the high-side switching element M1 is turned on (in FIG. 5, when the lo-side signal loout is at the L level) with consideration to the on period on the high side and the dead time period. A signal swload_tr that rises at the timing of rises in the signal swload and falls after a delay time decided by the delay circuit 64 is also generated from the signal swload and sent to the terminal swload_tr.

The clock generating unit 24 also includes a D flip-flop 66, a counter 67, and a selector circuit 68. A terminal Toscl of the clock generating unit 24 is connected to the input terminal of the counter 67, a terminal loout is connected to a data input terminal of the D flip-flop 66, and a terminal Ton is connected to a clock input terminal of the D flip-flop 66. An output terminal of the D flip-flop is connected to an enable input terminal EN of the counter 67. An output terminal of the counter 67 is connected to an input terminal of the selector circuit 68 and the output of the selector circuit 68 is connected to the terminals clk1 to clk8.

The D flip-flop 66 reads the signal loout when the signal Ton generated by the switching cycle generating unit 22 has become the H level. At this time, since the signal loout is at the H level, the D flip-flop 66 supplies a signal en_clk at the H level to the enable input terminal EN of the counter 67. A half cycle later when the signal Ton next becomes the H level, the signal en_clk becomes the L level due to an L-level signal loout being read. While the signal en_clk is at the H level, the counter 67 counts the signal Tosc1 of the frequency divider 23 and outputs a signal cnt. When the signal en_clk is at the L level, the count of the counter is reset. The signal cnt is inputted into the selector circuit 68 and the selector circuit 68 outputs an H level signal to an output selected in keeping with the count value. As examples, as depicted in FIG. 5, when the count value is "1", the selector circuit 68 outputs a clock signal clk1 at the H level to the terminal clk1, and when the count value is "8", the selector circuit 68 outputs a clock signal clk8 at the H level to the terminal clk8.

Note that although the counter 67 stops when the count value is "9" in the present embodiment, this is because eight clock signals clk1 to clk8 are sufficient for the imagined computation to be performed by the averaging calculation unit 43 and the correction calculating unit 44. This also prevents the counter 67 from overflowing and the count value returning to zero mid-operation which might occur if the count were allowed to continue without stopping.

Figure 6:
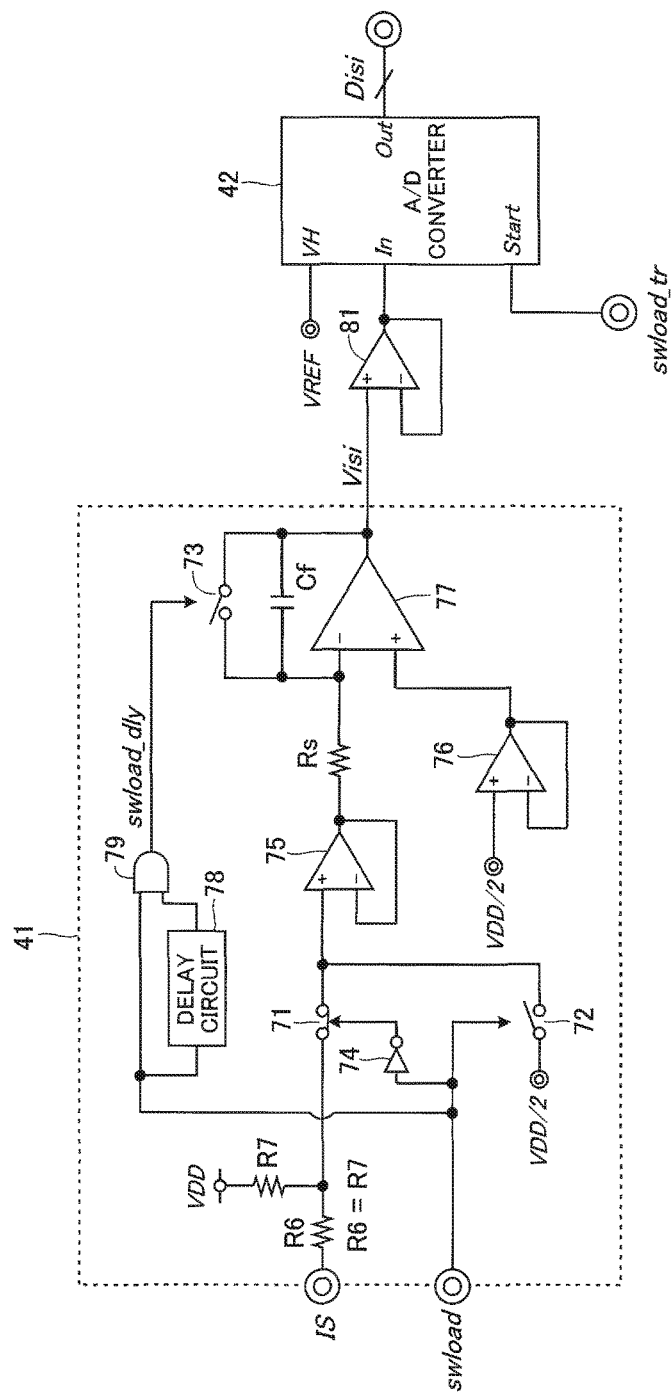
FIG. 6 is a circuit diagram depicting an example configuration of an integrator.
Figure 7:
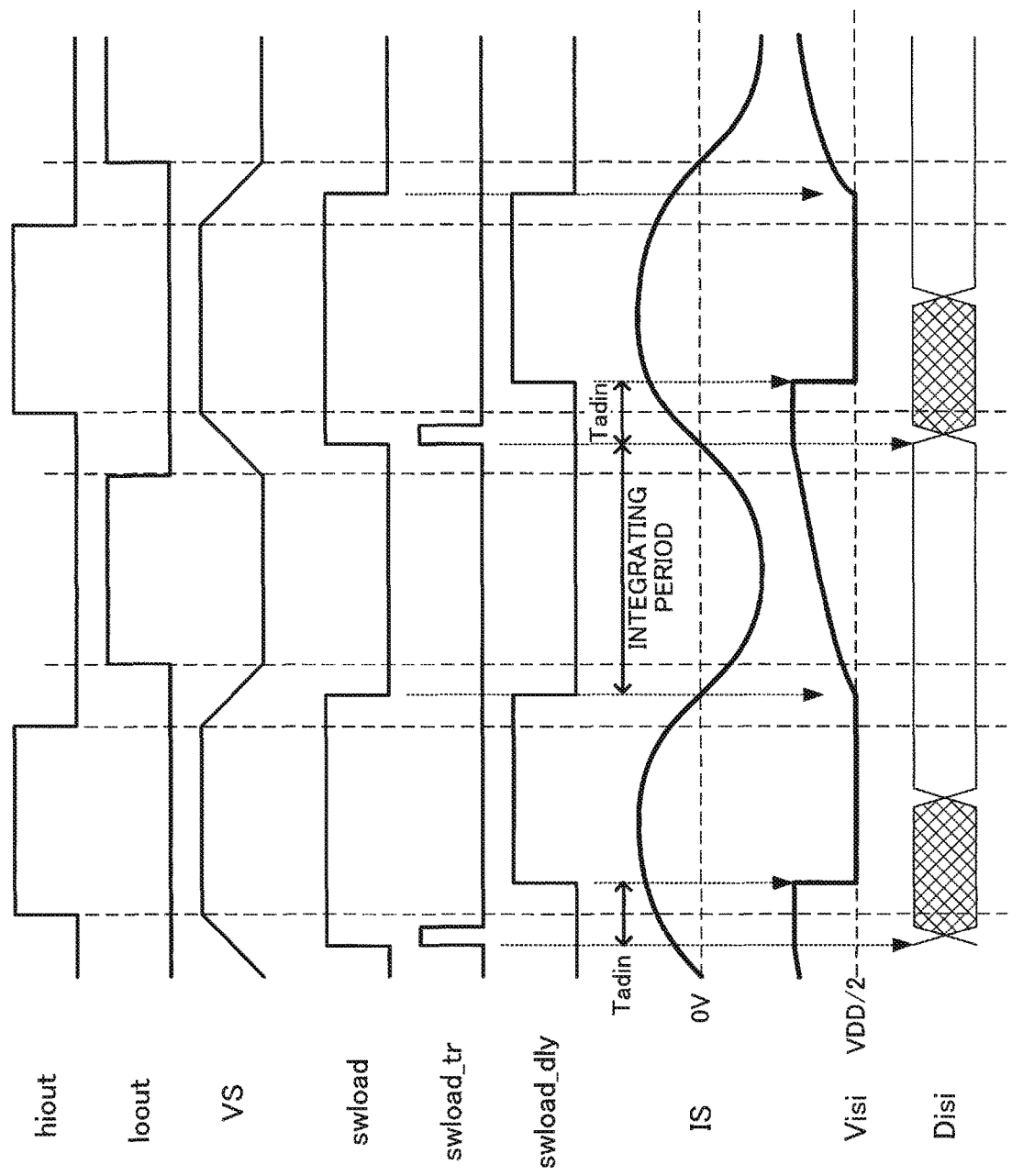
FIG. 7 is a timing chart depicting operating waveforms of principal parts of the integrator.

FIG. 6 is a circuit diagram depicting an example configuration of an integrator and FIG. 7 is a timing chart depicting the operating waveforms of the principal parts of the integrator.

The integrator 41 includes resistors R6 and R7, switches 71, 72, and 73, an inverter circuit 74, voltage followers 75 and 76, an operational amplifier 77, an integrating circuit including a resistor Rs and a capacitor Cf, a delay circuit 78, and an AND circuit 79.

The terminal IS is connected to one terminal of the resistor R6, the other terminal of the resistor R6 is connected to one terminal of the resistor R7, and the other terminal of the resistor R7 is connected to a power supply VDD. Here, the resistors R6 and R7 and the power supply VDD form a level shift circuit. Since the waveform of the resonant current fluctuates between plus and minus, the level shift circuit shifts the level from a range of −VDD to +VDD to a range of 0 to +VDD. In the present embodiment, since the waveform of the resonant current is detected in a range of −VDD to 0, by setting the values of the resistors R6 and R7 so as to be equal, the range of the signal after the level shift becomes 0 to +VDD/2. This means that the amplitude of the waveform of the resonant current increases the further the voltage after the level shift is from VDD/2.

The connection between the resistors R6 and R7 is connected to one terminal of the switch 71 and the other terminal of the switch 71 is connected to an input terminal of the voltage follower 75. The input terminal of the voltage follower 75 is connected to one terminal of the switch 72 and the other terminal of the switch 72 is connected to a terminal to which a voltage VDD/2 is applied. The switches 71 and 72 close (i.e., pass a signal) when an input signal received at a control terminal is at the H level and open (i.e., cut off the input signal) when the input signal is at the L level.

The terminal swload is connected to an input terminal of the inverter circuit 74 and the control terminal of the switch 72 and the output terminal of the inverter circuit 74 is connected to the control terminal of the switch 71. With this configuration, while the signal swload is at the L level, the shifted signal IS is supplied to the voltage follower 75 and while the signal swload is at the H level, the voltage VDD/2 is supplied to the voltage follower 75.

The output terminal of the voltage follower 75 is connected to one terminal of the resistor Rs of the integrating circuit and the other terminal of the resistor Rs is connected to the inverting input terminal of the operational amplifier 77, one terminal of the capacitor Cf, and one terminal of the switch 73 that opens when the input signal inputted into the control terminal is at the H level. The other terminal of the capacitor Cf and the other terminal of the switch 73 are connected to the output terminal of the operational amplifier 77. The non-inverting input terminal of the operational amplifier 77 is connected to the output terminal of the voltage follower 76, and an input terminal of the voltage follower 76 is supplied with the voltage VDD/2. With this configuration, when the switch 73 is open, the voltage of the inverting input terminal of the operational amplifier 77 becomes VDD/2 due to virtual shorting, so that the operational amplifier 77 outputs a signal Visi=VDD/2+(voltage across Cf). When the switch 73 is closed, both ends of the capacitor Cf are shorted, so that the charge accumulated in the capacitor Cf is discharged and the capacitor Cf is reset. The operational amplifier 77 functions as a voltage follower and outputs the signal Visi=VDD/2.

Opening/closing control of the switch 73 is performed by the delay circuit 78 and the AND circuit 79. The input terminal of the delay circuit 78 and one input terminal of the AND circuit 79 are connected to a terminal swload, an output terminal of the delay circuit 78 is connected to the other input terminal of the AND circuit 79, and the output terminal of the AND circuit 79 is connected to the control input terminal of the switch 73. As depicted in FIG. 7, while the signal swload is at the L level, the AND circuit 79 outputs the signal swload_dly at the L level. When the signal swload becomes the H level, the AND circuit 79 outputs the signal swload_dly that becomes the H level having been delayed by a delay time decided by the delay circuit 78. In FIG. 7, the period where the signal swload is at the L level is an integrating period where the integrating circuit integrates the minus signal IS that corresponds to the resonant current, and the following period Tadin is a period where a signal Visi indicating the integration result is inputted by the A/D converter 42. After this, while the signal swload_dly is at the H level, the switch 73 is closed so that the signal Visi outputted by the integrator 41 becomes Visi=VDD/2. During the period Tadin, the signal swload_dly is at the H level and discharging of the load of the capacitor Cf by the switch 73 is not performed. On the other hand, since the switch 71 is open and the switch 72 is closed, the potential at both ends of the resistor Rs is equal at VDD/2, so that no charging/discharging current flows for the capacitor Cf. This results in the output voltage of the operational amplifier 77 maintaining a constant value.

The signal Visi from the integrator 41 is inputted into the A/D converter 42 via the voltage follower 81. The A/D converter 42 has a terminal In for inputting the signal Visi, a terminal VH for inputting a voltage VREF used for quantization, a terminal Start for receiving a signal swload_tr when A/D conversion is to start, and a terminal Out for outputting the digitized signal Disi. The A/D converter 42 receives the signal swload_tr from the clock generating unit 24 and starts A/D conversion of the signal Visi. The digitized signal Disi is sent to the averaging calculation unit 43 and averaged, and the correction calculating unit 44 corrects the detected resonant current that is the output of the averaging calculation unit 43.

With this configuration, the control circuit 14 of the switching power supply device controls the switching cycle of the switching elements M1 and M2 in accordance with the signal FB of the error voltage detected on the secondary side so that the output voltage Vo is stabilized at the target value. The load current is estimated based on the average value of the resonant current detected on the primary side. Here, the switching cycle controlled by the control circuit 14 is changed so that the output voltage becomes constant even when there is a change in the input voltage and/or the load current. On the other hand, when the load current used for overload protection is set at the overload protection unit 28, in addition to the output voltage, a maximum load current is also set so as to be constant. Here, as described earlier, since the switching cycle and the input voltage are negatively correlated, the signal FB that decides the switching cycle will include information corresponding to the input voltage.

Correction of the estimated load current value in keeping with the input voltage is performed using this signal FB. Next, correction of the estimated load current value will be described in detail.

Figure 8:
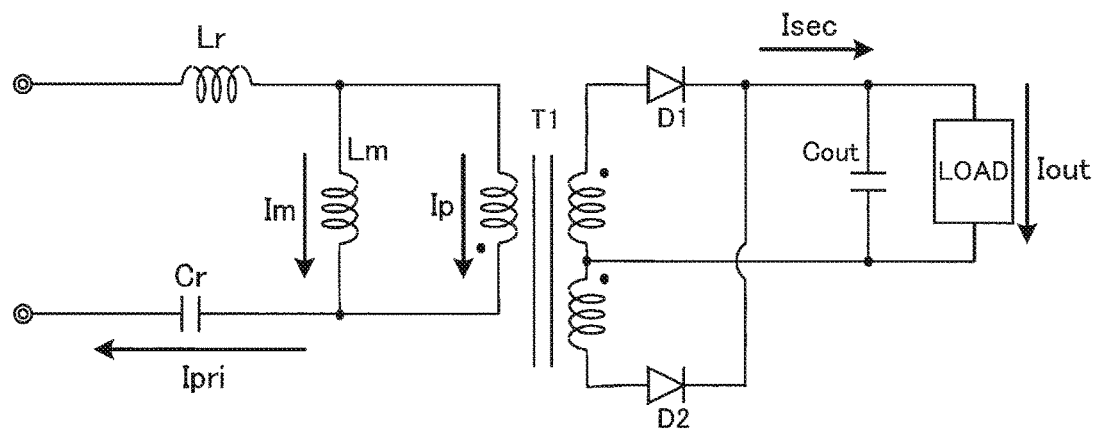
FIG. 8 is a circuit diagram of a current resonance circuit which is useful in explaining the relationship between primary-side resonant current and secondary-side load current under ideal conditions.
Figure 9:
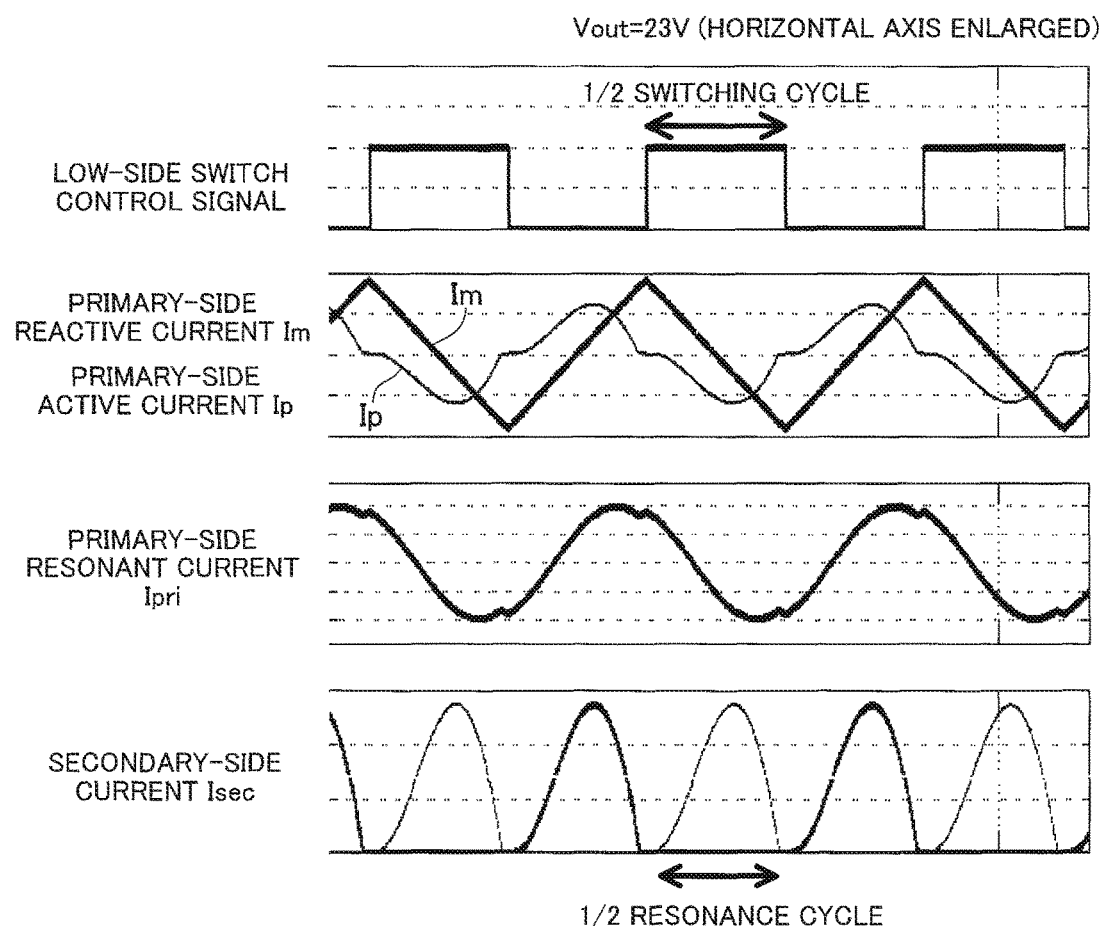
FIG. 9 depicts the principal waveforms in the current resonance circuit.
Figure 10:
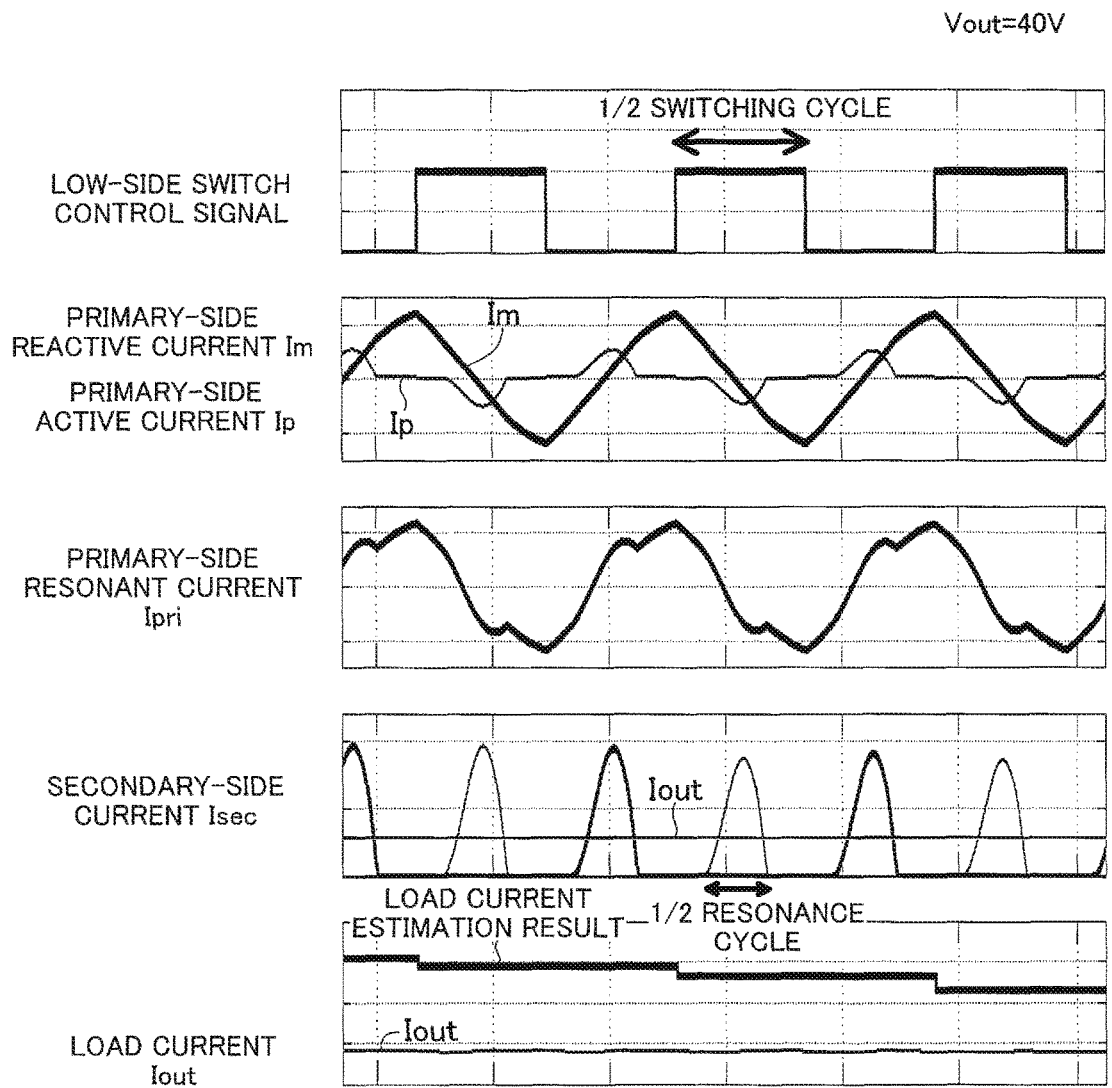
FIG. 10 depicts principal current waveforms and simulation results for a load current when a correction calculating unit is not used.
Figure 11:
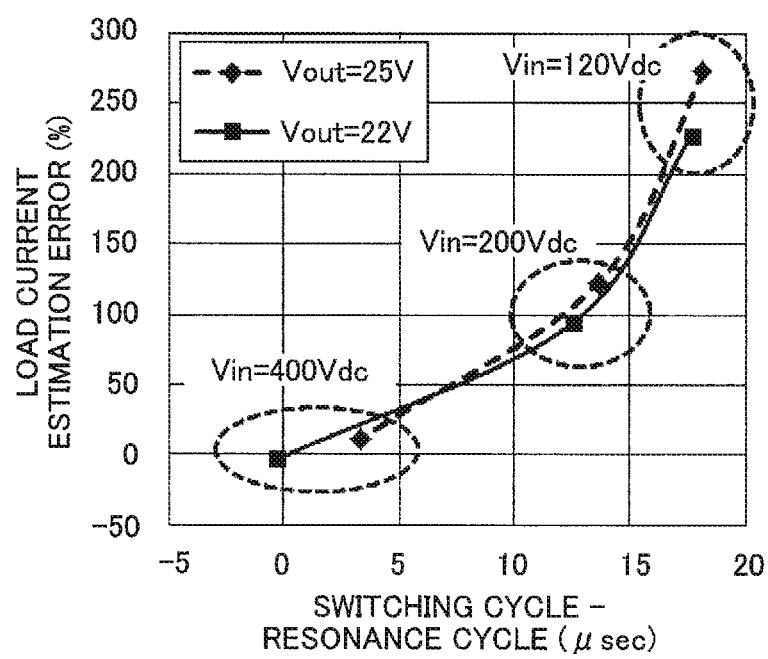
FIG. 11 depicts simulation results of an error in estimating load current when a correction calculating unit is not used.

FIG. 8 is a circuit diagram of a current resonance circuit which is useful in explaining the relationship between the primary-side resonant current and the secondary-side load current under ideal conditions. FIG. 9 depicts the principal waveforms in a current resonance circuit. FIG. 10 depicts the principal current waveforms and simulation results for the load current when a correction calculating unit is not used, and FIG. 11 depicts simulation results of the error in estimating load current when a correction calculating unit is not used. In FIG. 8, component elements that are the same as in FIG. 1 have been appended with the same reference numerals and detailed description of these elements is omitted. In FIG. 11, the vertical axis depicts the error in estimating load current and the horizontal axis depicts the difference between the switching cycle and the resonance cycle.

As depicted in FIG. 8, in the current resonance circuit, since the secondary-side current Isec is decided by the primary-side active current Ip and the turn ratio N of the transformer, and the load current Iout is the average value of the secondary-side current Isec, it is possible to estimate the load current Iout by detecting the primary-side active current Ip. However, for an actual transformer T1, it is not possible to isolate and detect only the primary-side active current Ip. For this reason, the active current is first estimated from the primary-side resonant current Ipri.

In the current waveforms in FIG. 9, when the primary-side reactive current Im whose slope is decided by the magnetizing inductance Lm and the voltage across the magnetizing inductance Lm is assumed to be a triangular waveform with an average value of zero, integrating during the switching cycle Tsw produces a result of zero. Since the current resonance circuit is operated with a duty ratio of 50%, it is possible to assume that the result of integrating for a half cycle will be zero as indicated in Expression 1 below.

$$\int_0^{Tsw/2} Im\, dt \cong 0 \qquad (1)$$

When the primary-side resonant current Ipri is assumed to be the sum of the primary-side active current Ip and the primary-side reactive current Im, the result of integrating the primary-side resonant current Ipri for a half cycle is the result of integrating the primary-side active current Ip for half a cycle.

$$Ipri = Ip + Im \qquad (2)$$

$$\int_0^{Tsw/2} Isec\, dt = N \times \int_0^{Tsw/2} |Ip|dt \cong N \times \int_0^{Tsw/2} |Ipri|dt \qquad (3)$$

The relationship between the secondary-side current Isec and the primary-side active current Ip extracted from the primary-side resonant current Ipri by integrating for a half cycle is expressed as follows using the turn ratio N of the transformer.

$$Isec = N \times |Ip| \qquad (4)$$

$$\int_0^{Tsw/2} Isec\, dt = N \times \int_0^{Tsw/2} |Ip|dt \qquad (5)$$

The load current Iout is the average of the secondary-side current Isec. When the configuration of the switching cycle generating unit depicted in FIG. 2 is assumed, the switching cycle Tsw (when double the cycle of the output Ton of the switching cycle generating unit) is given by Expression 6 below. Since this switching cycle Tsw is proportional to the signal Dn that is the output of the A/D converter 21, the equation for estimating the load current from the primary-side resonant current Ipri is expressed as Expression 7 below. Note that in the expression, Tosc is the output cycle of the high-frequency oscillator 31, which may be assumed to be known.

$$Tsw = 2 \times Dn \times Tosc \qquad (6)$$

$$Iout = \frac{1}{Tsw/2} \times N \times \int_0^{Tsw/2} |Ipri|dt \qquad (7)$$
$$\cong \frac{N}{Dn \times Tosc} \times \int_0^{Tsw/2} |Ipri|dt$$

With a configuration where the signal IS is processed by the integrator 41, the A/D converter 42, and the averaging calculation unit 43 as depicted in FIG. 2, it is possible to estimate the load current Iout based on Expression 7. However, depending on the operating conditions, as depicted in FIG. 10, there are cases where the result of integrating the primary-side reactive current Im for a half cycle greatly diverges from zero, so that the assumption given in Expression 1 is not satisfied and at this time, there will be a large error in the estimated current. This is because Expression 1 is only satisfied in a range where the curve of the primary-side reactive current Im is regarded as linear, and as the switching cycle moves away from the resonance cycle and becomes longer, the region where the above assumption does not hold also increases. Note that even when the curve is non-linear, if the integrating period is one switching cycle, the result of integrating the primary-side reactive current Im will be zero.

As a result of performing simulations under various conditions and finding the relationship between the estimation error for the load current and the difference between the switching cycle and the resonance cycle of the current resonance circuit $(2\pi\sqrt{(Lr \times Cr)})$, it was understood that the estimation precision for the load current and the switching cycle are correlated as depicted in FIG. 11.

The estimation error $\Delta Iout$ (%) of the load current in FIG. 11 is a function f (Tsw−Tr) that has the difference between the switching cycle Tsw and the resonance cycle Tr as a variable. When it is assumed that the true value of the load current is "Ireal" and the estimated value of the load current using Expression 7 is "Iestimate", as depicted in Expressions 8 and 9, it is understood that the true value of the estimation error for the load current $\Delta Iout$ is found by correcting using the correction function f(Tsw−Tr).

$$\Delta Iout = \frac{Iestimate - Ireal}{Ireal} \equiv f(Tsw - Tr) \qquad (8)$$

$$Ireal = \frac{Iestimate}{f(Tsw - Tr) + 1} \qquad (9)$$

An expression that estimates the load current by adding the correction terms in Expressions 8 and 9 to the result of estimating load current in Expression 7 is given in Expression 10.

$$Iout \cong \frac{N}{Dn \times Tosc} \times \int_0^{Tsw/2} |Ipri|dt \times \frac{1}{f(Tsw - Tr) + 1} \qquad (10)$$

Here, since the correction function f (Tsw−Tr) differs according to the component values and/or the operating specification of the current resonance circuit, the correction function f (Tsw−Tr) is derived by simulation or the like.

For the characteristics in FIG. 11, when approximating using a quadratic function, the correction function f(Tsw−Tr) is expressed by Expression 11, for example. The approximation order may be changed according to the precision demanded for current detection.

$$f(Tsw-Tr) \equiv 0.5164 \times (Tsw-Tr)^2 + 1.8958 \times (Tsw-Tr) - 4.2225 \quad (11)$$

By substituting Expression 11 into Expression 10, it is possible to improve the estimation precision of the load current.

By using a digital computational circuit that computes the (×1/{f(Tsw−Tr)+1}) correction term in Expression 10 as the correction calculating unit depicted in FIG. 2, it is possible to realize high precision when estimating the current.

Figure 12A:
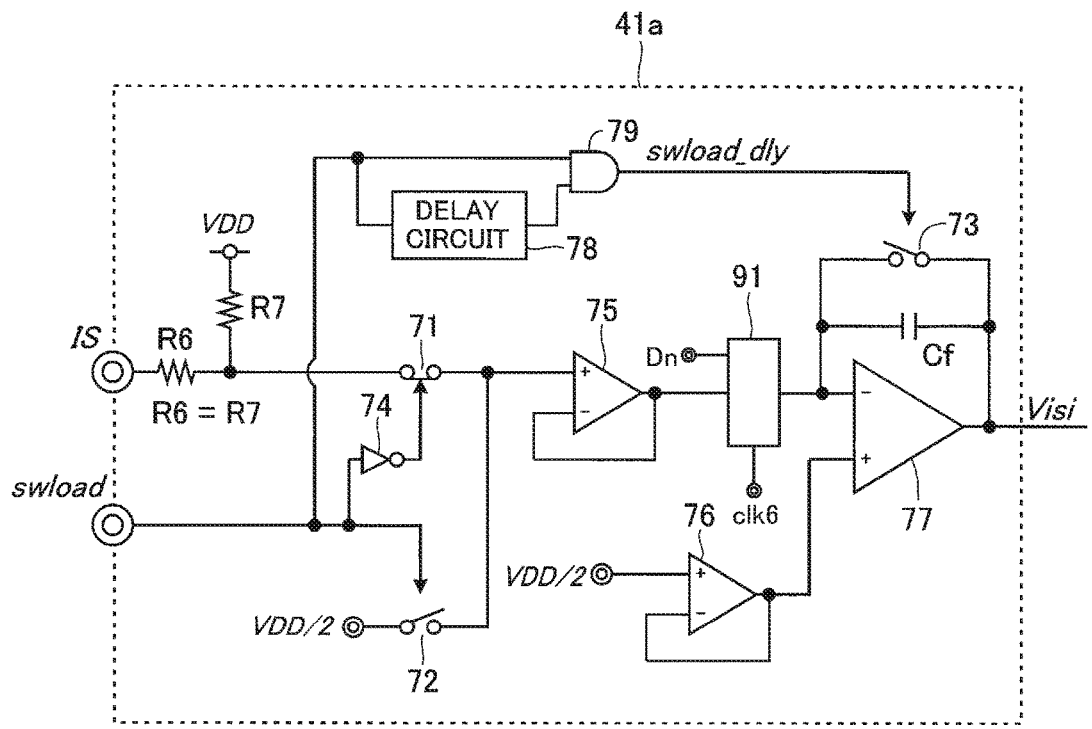
FIGS. 12A and 12B depict an example configuration of an integrator used in a control circuit of a switching power supply device according to a second embodiment, where
Figure 12B:
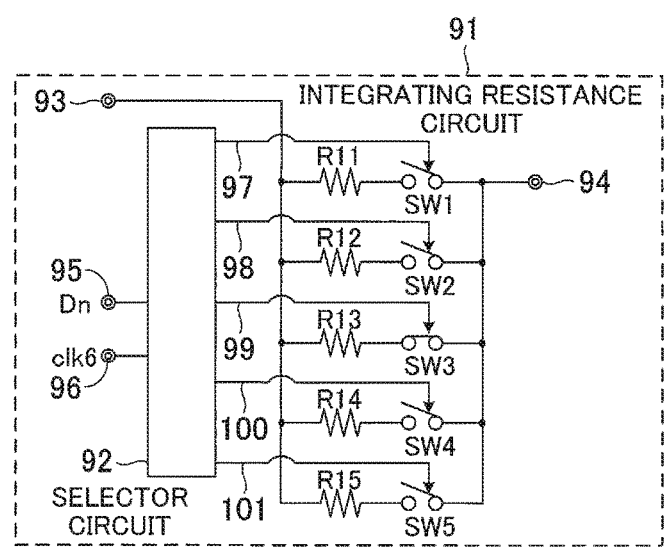

FIGS. 12A and 12B depict an example configuration of an integrator used in a control circuit of a switching power supply device according to a second embodiment, with FIG. 12A a circuit diagram depicting an example configuration of the integrator and FIG. 12B depicting an example configuration of an integrating resistance circuit of the integrator. In FIG. 12, component elements that are the same as in FIG. 6 have been appended with the same reference numerals and detailed description of these elements is omitted.

Compared to the integrator 41 of the control circuit 14 in the switching power supply device according to the first embodiment, an integrator 41a of a control circuit in the switching power supply device according to the second embodiment differs in that the integrating resistance is changed from the resistor Rs that is fixed to an integrating resistance circuit 91. As depicted in FIG. 12B, the integrating resistance circuit 91 includes a selector circuit 92, resistors R11, R12, R13, R14, and R15, and switches SW1, SW2, SW3, SW4, and SW5. Terminals at one end of each of the resistors R11, R12, R13, R14, and R15 are interconnected and are also connected to an input terminal 93 that receives an output signal of the voltage follower 75. The terminals at the other end of the resistors R11, R12, R13, R14, and R15 are connected to the terminals at one end of the switches SW1, SW2, SW3, SW4, and SW5, respectively. The terminals at the other end of the switches SW1, SW2, SW3, SW4, and SW5 are interconnected and are also connected to an output terminal 94 that is connected to the inverting input terminal of the operational amplifier 77. The selector circuit 92 includes a terminal 95 that receives the signal Dn outputted by the A/D converter 21, a terminal 96 that receives the clock signal clk6 outputted by the clock generating unit 24, and output terminals 97, 98, 99, 100, and 101. The output terminals 97, 98, 99, 100, and 101 are connected to control terminals of the switches SW1, SW2, SW3, SW4, and SW5, respectively.

The integrating resistance circuit 91 selects the switches SW1, SW2, SW3, SW4, and SW5 to be closed and opened in accordance with cycle information included in the signal Dn from the A/D converter 21 received by the terminal 95. That is, the integrating resistance circuit 91 changes the gain of the integrating circuit in accordance with the cycle information to adjust the level of the signal Visi outputted by the integrator 41. As one example, when the switching cycle Tsw is long, the selector circuit 92 selects a resistor with a large resistance value out of the resistors R11, R12, R13, R14, and R15 to lower the gain of the integrating circuit. By doing so, the rate by which the integrated value of the integrator 41 increases is lowered, which makes it possible to avoid a state where the integrated value reaches the power supply voltage and becomes saturated, even when the integrating operation continues for a long period. Conversely, when the switching cycle Tsw is short, the selector circuit 92 selects a resistor with a small resistance value to increase the gain of the integrating circuit. By doing so, the rate of increase in the integrated value of the integrator increases so that the signal Visi has a sufficient level, even for an integrating operation performed for a short period. When the switching cycle Tsw is short, the level of the next signal that is inputted into the A/D converter 42 falls. Therefore, the A/D converter 42 needs to be of high precision. However, raising the gain of the integrating circuit eliminates the necessity of a high-precision A/D converter 42. Note that the clock signal clk6 provides the timing at which the selector circuit 92 selects the integrating resistance.

In this way, with the integrator 41a, since the gain is changed by selecting the value of the integrating resistance in keeping with the cycle information, the correction calculation performed at the correction calculating unit 44a disposed downstream is configured so as to cancel out the influence of this change.

Figure 13:
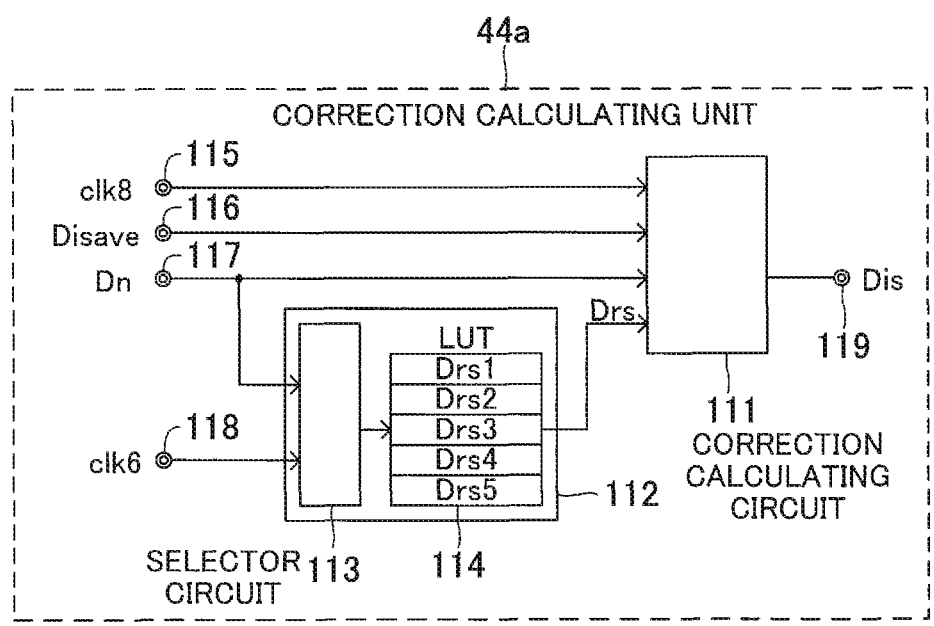
FIG. 13 depicts an example configuration of a correction calculating unit used in the control circuit of a switching power supply device according to the second embodiment.
Figure 14A:
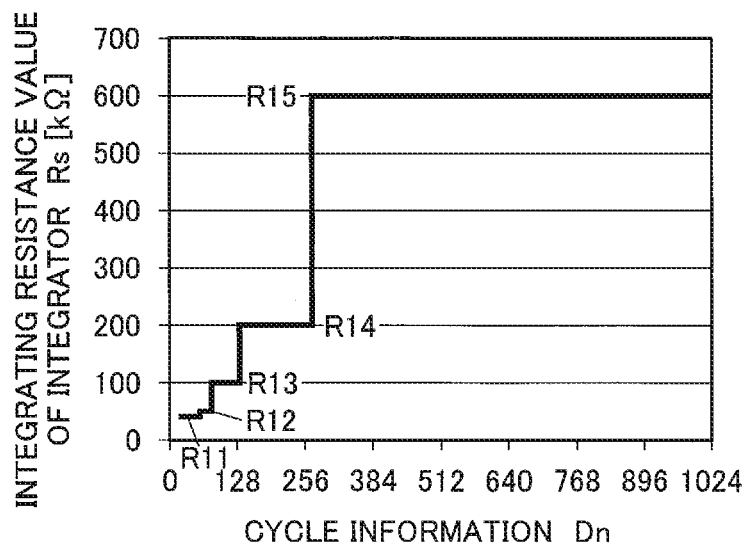
FIG. 14A and FIG. 14B are diagrams useful in explaining switching of gain with respect to a cycle, with FIG. 14A depicting the correspondence between the cycle and an integrating resistance value and FIG. 14B depicting the correspondence between the cycle and a correction coefficient.
Figure 14B:
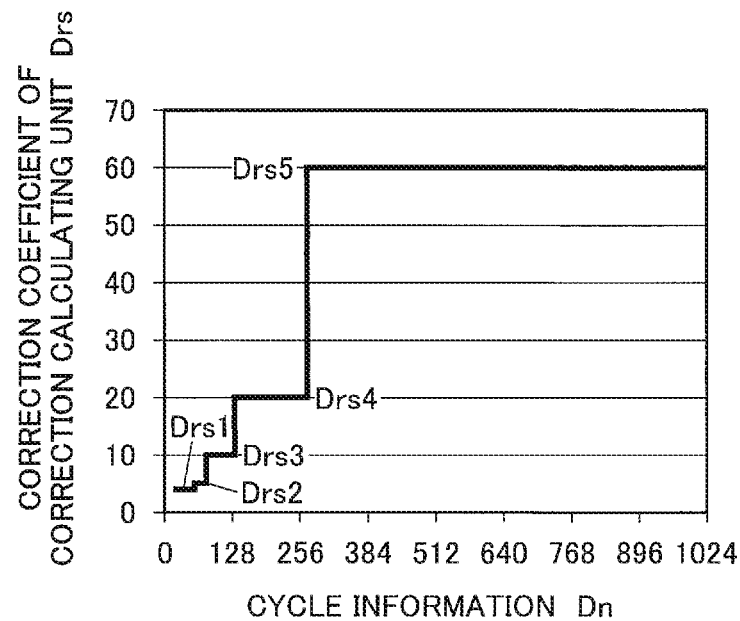

FIG. 13 depicts an example configuration of a correction calculating unit used in the control circuit of a switching power supply device according to the second embodiment, and FIG. 14A and FIG. 14B are diagrams useful in explaining switching of gain with respect to the cycle, with FIG. 14A depicting the correspondence between the cycle and the integrating resistance value and FIG. 14B depicting the correspondence between the cycle and the correction coefficient.

The correction calculating unit 44a has a correction calculating circuit 111 and a correction coefficient circuit 112, with the correction coefficient circuit 112 including a selector circuit 113 and a lookup table 114. The lookup table 114 stores correction coefficients Drs1, Drs2, Drs3, Drs4, and Drs5 corresponding to the resistors R11, R12, R13, R14, and R15 of the integrating resistance circuit 91, with a correction coefficient Drs with a value in keeping with the cycle information being selected and outputted by the selector circuit 113.

The correction calculating circuit 111 receives the clock signal clk8 from a terminal 115, receives the signal Disave from a terminal 116, receives the signal Dn outputted by the A/D converter 21 from a terminal 117, and receives the correction coefficient Drs from the correction coefficient circuit 112. The correction calculating circuit 111 outputs, to the terminal 119, the signal Dis with an estimated load current value that has been corrected in keeping with the input voltage and the gain of the integrator 41a.

In the correction calculating unit 44a, the correction coefficient circuit 112 selects a correction coefficient Drs corresponding to the cycle from the cycle information of the signal Dn at the timing at which the clock signal clk6 is received from the terminal 118 and provides the correction coefficient Drs to the correction calculating circuit 111. Here, when the integrating resistance circuit 91 has selected an integrating resistance value in keeping with a relationship between the cycle information and the integrating resistance value like that depicted in FIG. 14A, the correction coefficient circuit 112 also selects a correction coefficient in keeping with a relationship between the cycle information and the correction coefficient like that depicted in FIG. 14B. As one example, when the integrating resistance circuit 91 has selected the resistor R13 as depicted in FIG. 12B, the correction coefficient circuit 112 selects the correction coefficient Drs3. The relationship between the integrator 41a and the correction calculating unit 44a is expressed by Expression 12.

$$Iout \cong \frac{N}{Dn \times Tosc} \times \frac{1}{RsCf} \int_0^{Tsw/2} |Ipri|dt \times \frac{1}{f(Tsw-Tr)+1} \times Drs \quad (12)$$

That is, although in Expression 10, the resistor Rs has a fixed resistance and is therefore treated as a constant and omitted from the expression, in Expression 12, the resistor Rs is incorporated together with the capacitor Cf as a variable expressing the gain. In Expression 12, the correction coefficient Drs is included as a variable that cancels out the gain, with this variable being selected by the correction coefficient circuit 112. By doing so, the estimated load current value is effectively the same as the value given in Expression 10.

Figure 15:
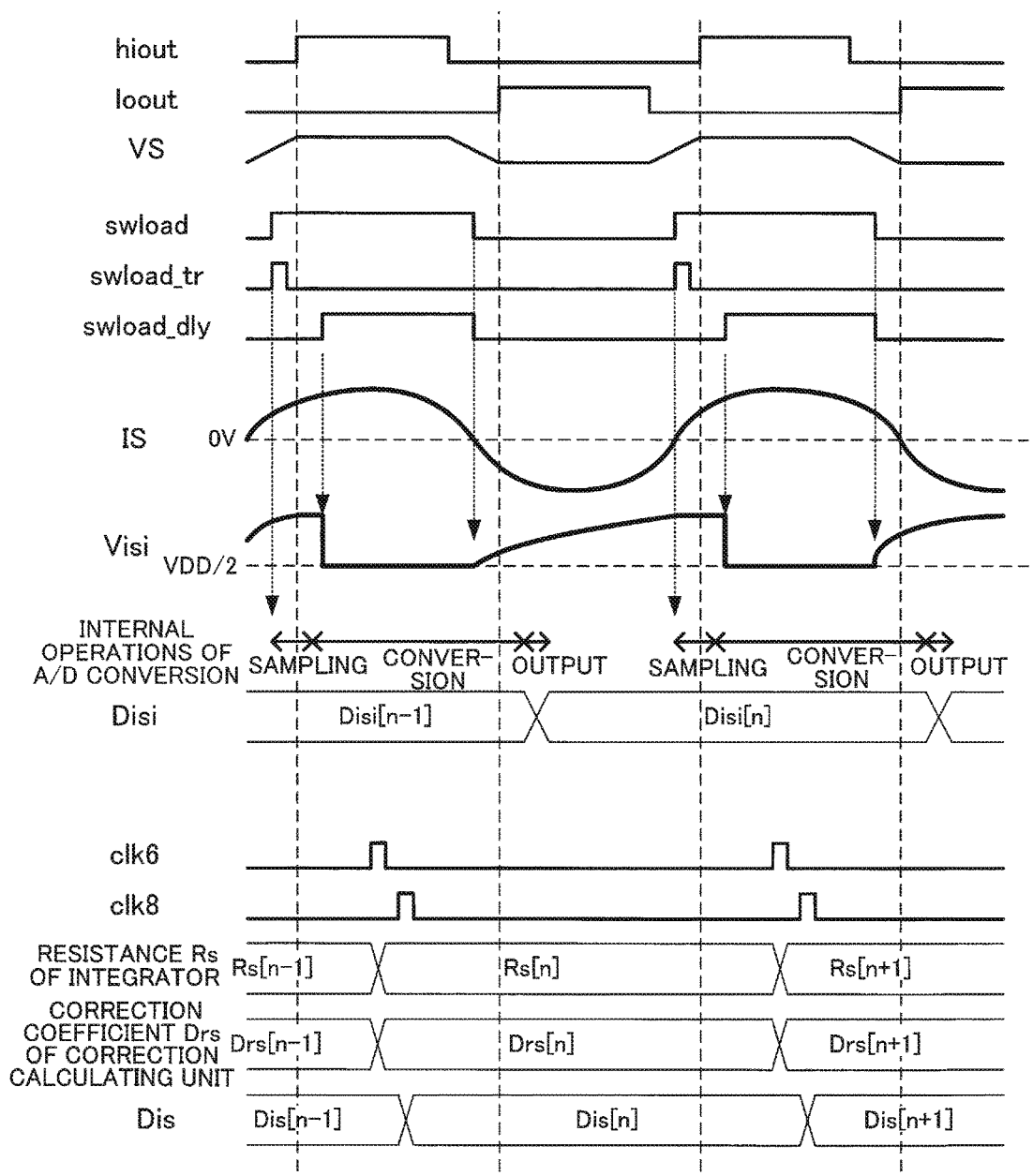
FIG. 15 is a timing chart depicting operating waveforms of principal parts of the control circuit of a switching power supply device according to the second embodiment.
Figure 16A:
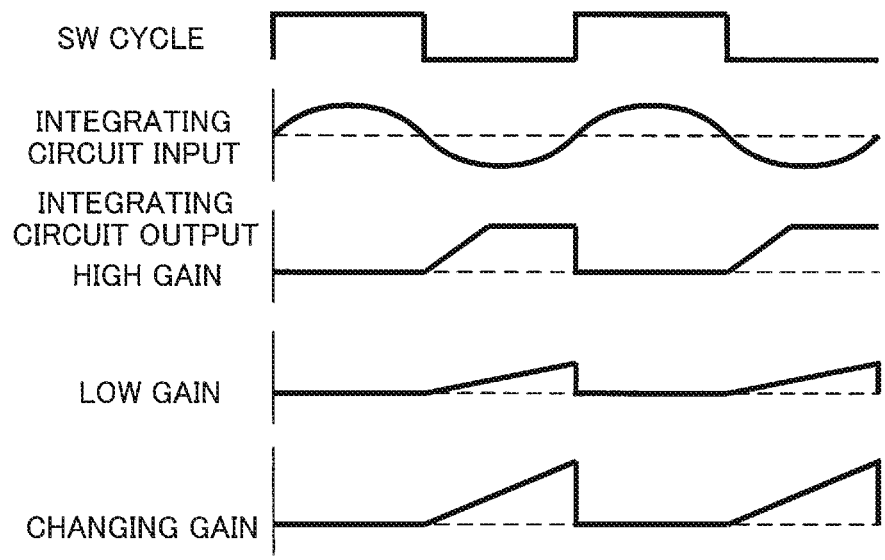
FIGS. 16A and 16B are useful in explaining the effect of an integrator, with FIG. 16A depicting when a switching cycle is long and FIG. 16B depicting when a switching cycle is short.
Figure 16B:
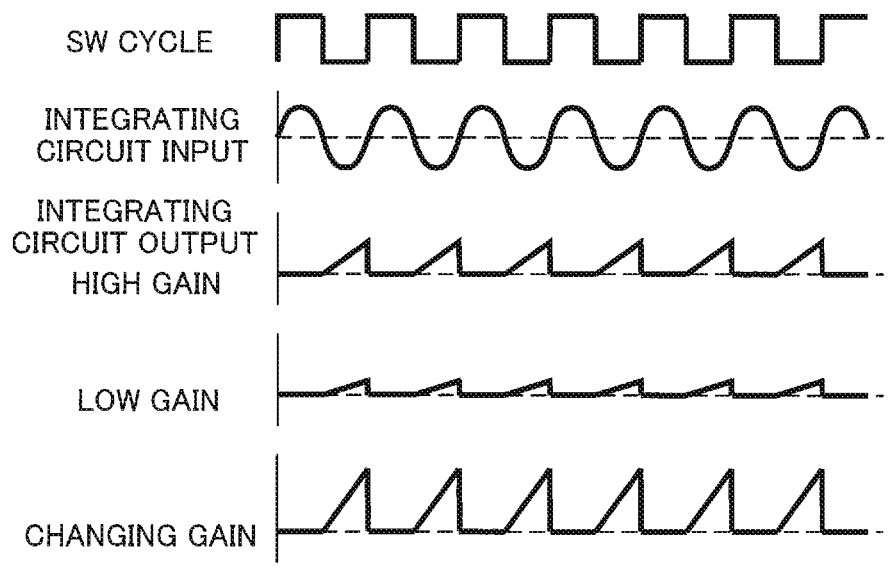

FIG. 15 is a timing chart depicting the operating waveforms of the principal parts of the control circuit of the switching power supply device according to the second embodiment. FIGS. 16A and 16B are useful in explaining the effect of an integrator, with FIG. 16A depicting when the switching cycle is long and FIG. 16B depicting when the switching cycle is short.

In the timing chart in FIG. 15, from the top down, the signal hiout, the signal loout, the high-side reference potential VS, the signal swload, the signal swload_tr, the signal swload_dly, the signal IS, the signal Visi, the signal Disi, the clock signal clk 6, the clock signal clk 8, the resistance Rs, the correction coefficient Drs, and the signal Dis are depicted. In FIGS. 16A and 16B, from the top down, the switching cycle, the integrating circuit input, the integrating circuit output for a high gain, the integrating circuit output for a low gain, and the integrating circuit output when the gain changes are depicted.

The integrator 41a receives the signal swload and performs the integrating operation for only the period where the signal swload is at the level L. Accordingly, switching of the resistance by the selector circuit 92 of the integrating resistance circuit 91 and switching of the correction coefficient by the selector circuit 113 of the correction coefficient circuit 112 are performed in a period where the signal swload is at the H level and the integrator 41a does not perform an integrating operation. In the example depicted in FIG. 15, the switching of the resistance and the correction coefficient is carried out at the timing where the clock signal clk6, which is generated in the period where the signal swload_dly is at the H level, has been received. With the correction calculating unit 44a, after the selector circuit 113 has switched the correction coefficient Drs, at the timing where the clock signal clk8 has been received, the correction calculating circuit 111 performs a correction calculation for the signal Disave according to the signal Dn and the correction coefficient Drs and outputs the signal Dis of the estimated load current value.

Although the effect of the integrator 41a will be described next, the description will first focus on a case where the gain of the integrating circuit is constant as with the control circuit 14 of the switching power supply device according to the first embodiment. When the switching cycle is long, as depicted in FIG. 16A, although it is not problematic when the integrating circuit is set at a low gain, when the integrating circuit is set at a high gain, the longer the half cycle where integration is performed, the greater the probability of saturation occurring during integration. Conversely, when the switching cycle is short, as depicted in FIG. 16B, although it is not problematic when the integrating circuit is set at a high gain, when the integrating circuit is set at a low gain, the shorter the half cycle where integration is performed, the greater the probability of the integration quickly ending and a signal with an excessively low level being passed to the next processing stage.

On the other hand, with the integrator 41a, the gain of the integrating circuit is changed in accordance with the switching cycle to normalize the output signal of the integrating circuit. By doing so, it is possible to eliminate the dependency on the switching cycle of the output signal of the integrating circuit. By performing correction at the correction calculating unit 44a in accordance with changes in the gain of the integrating circuit so as to cancel out the changes in the gain of the integrating circuit, the correction calculating unit 44a is capable of outputting a signal Dis with the correct estimated load current value.

Figure 17A:
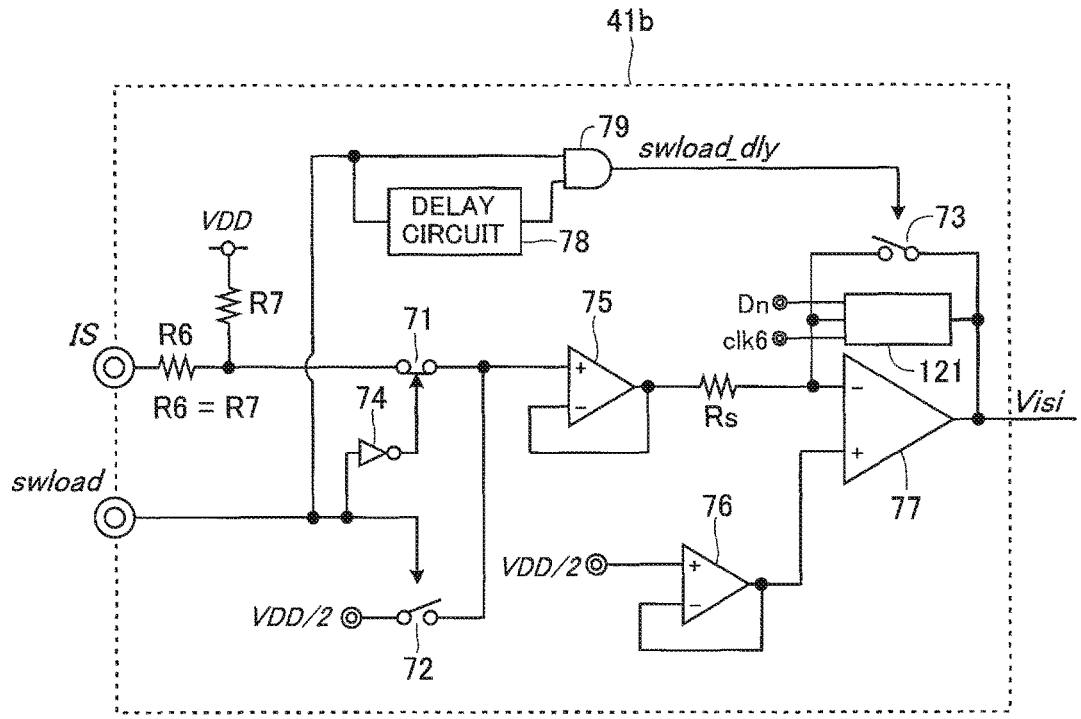
FIGS. 17A and 17B are diagrams depicting an example configuration of an integrator used in a control circuit of a switching power supply device according to a third embodiment, where
Figure 17B:
Figure 17B:
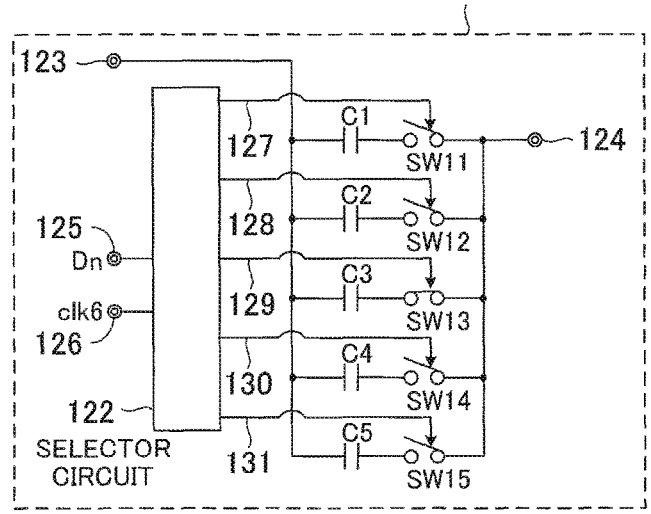
Figure 18:
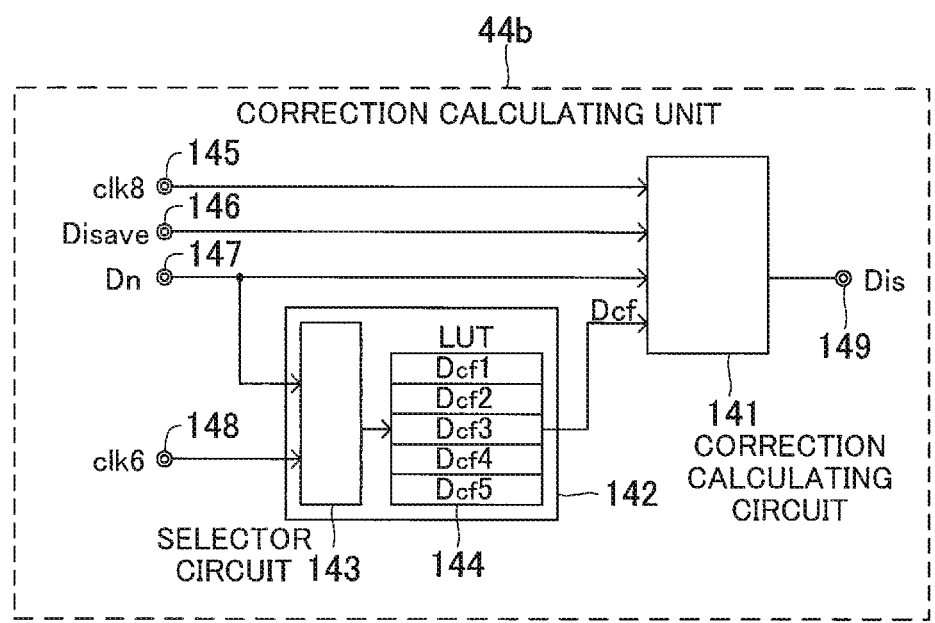
FIG. 18 depicts an example configuration of a correction calculating unit used in the control circuit of a switching power supply device according to the third embodiment.
Figure 19A:
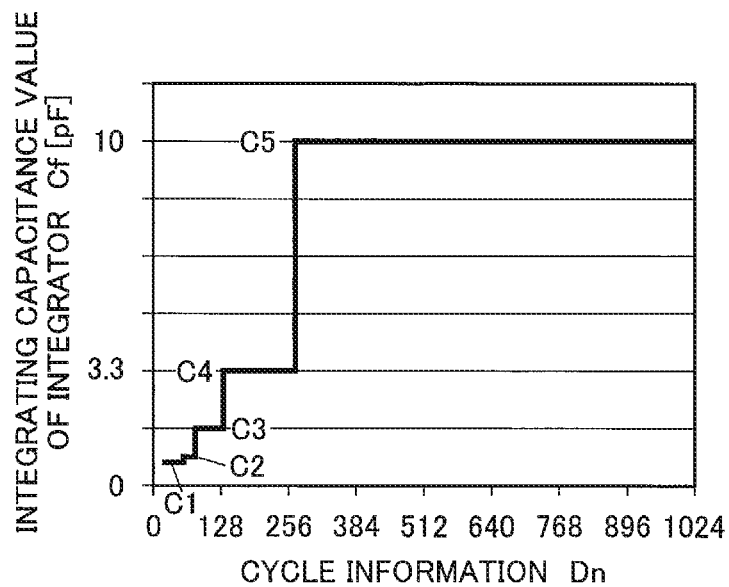
FIGS. 19A and 19B are diagrams useful in explaining switching of gain with respect to a cycle, with FIG. 19A depicting the correspondence between the cycle and an integrating capacitance value and FIG. 19B depicting the correspondence between the cycle and a correction coefficient.
Figure 19B:
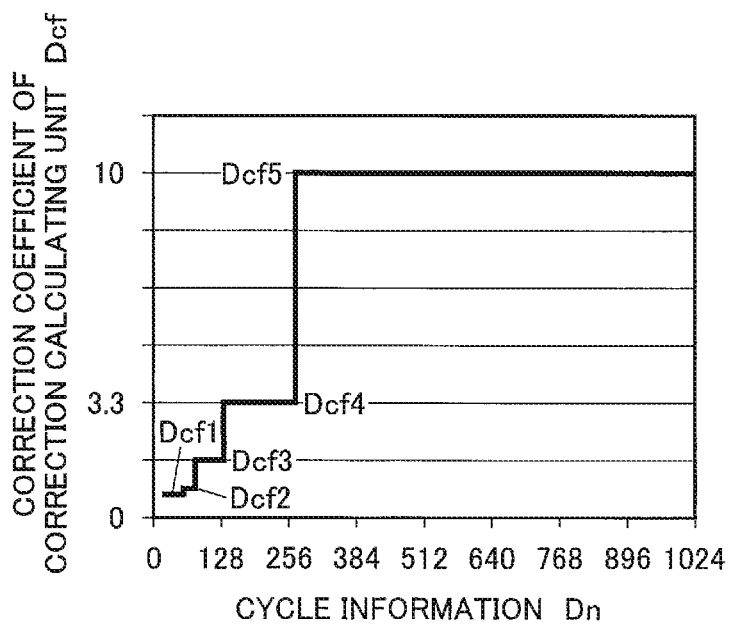

FIGS. 17A and 17B are diagrams depicting an example configuration of an integrator used in a control circuit of a switching power supply device according to a third embodiment, where FIG. 17A is a circuit diagram depicting an example configuration of the integrator and FIG. 17B depicts an example configuration of an integrating capacitance circuit of the integrator. FIG. 18 depicts an example configuration of a correction calculating unit used in the control circuit of a switching power supply device according to the third embodiment, and FIGS. 19A and 19B are diagrams useful in explaining switching of gain with respect to a cycle, with FIG. 19A depicting the correspondence between the cycle and an integrating capacitance value and FIG. 19B depicting the correspondence between the cycle and a correction coefficient. Note that in FIG. 17A, component elements that are the same or equivalent as the component elements in FIG. 6 have been appended with the same reference numerals and detailed description of these elements is omitted.

Compared to the integrator 41 of the control circuit 14 in the switching power supply device according to the first embodiment, the integrator 41b of the control circuit in the switching power supply device according to the third embodiment differs in that the integrating capacitance is changed from the capacitor Cf that is fixed to an integrating capacitance circuit 121. As depicted in FIG. 17B, the integrating capacitance circuit 121 includes a selector circuit 122, capacitors C1, C2, C3, C4, and C5, and switches SW11, SW12, SW13, SW14, and SW15. Terminals at one end of each of the capacitors C1, C2, C3, C4, and C5 are interconnected and are connected via an input terminal 123 to the inverting input terminal of the operational amplifier 77. The terminals at the other end of the capacitors C1, C2, C3, C4, and C5 are connected to the terminals at one end of the switches SW11, SW12, SW13, SW14, and SW15, respectively. The terminals at the other end of the switches SW11, SW12, SW13, SW14, and SW15 are interconnected and are also connected via an output terminal 124 to the output terminal of the operational amplifier 77. The selector circuit 122 includes a terminal 125 that receives the signal Dn outputted by the A/D converter 21, a terminal 126 that receives the clock signal clk6 outputted by the clock generating unit 24, and output terminals 127, 128, 129, 130, and 131. The output terminals 127, 128, 129, 130, and 131 are connected to control terminals of the switches SW11, SW12, SW13, SW14, and SW15, respectively.

The integrating capacitance circuit 121 selects the switches SW11, SW12, SW13, SW14, and SW15 to be closed and opened in accordance with cycle information included in the signal Dn from the A/D converter 21 received by the terminal 125. That is, the integrating capacitance circuit 121 changes the gain of the integrating circuit in accordance with the cycle information to adjust the level of the signal Visi outputted by the integrator 41b. As one example, when the switching cycle Tsw is long, the selector circuit 122 selects a capacitor with a large capacitance value out of the capacitors C1, C2, C3, C4, and C5 to lower the gain of the integrating circuit. Conversely, when the switching cycle Tsw is short, the selector circuit 122 selects a capacitor with a small capacitance value to raise the gain of the integrating circuit. Note that the clock signal clk6 provides the timing at which the selector circuit 122 selects the integrating capacitance.

The correction calculating unit 44b has a correction calculating circuit 141 and a correction coefficient circuit 142, with the correction coefficient circuit 142 including a selector circuit 143 and a lookup table 144. The lookup table 144 stores correction coefficients Dcf1, Dcf2, Dcf3, Dcf4, and Dcf5 that correspond to the capacitors C1, C2, C3, C4, and C5 of the integrating capacitance circuit 121, with a correction coefficient Dcf with a value in keeping with the cycle information being selected and outputted by the selector circuit 143 at the timing where the clock signal clk6 is inputted into the terminal 148.

The correction calculating circuit 141 receives the clock signal clk8 from a terminal 145, receives the signal Disave from a terminal 146, receives the signal Dn outputted by the A/D converter 21 from a terminal 147, and receives the correction coefficient Dcf from the correction coefficient circuit 142. The correction calculating circuit 141 outputs, to the terminal 149, the signal Dis with an estimated load current value that has been corrected in keeping with the input voltage and the gain of the integrator 41b.

In the correction calculating unit 44b, the correction coefficient circuit 142 selects a correction coefficient Dcf corresponding to the cycle from the cycle information of the signal Dn at the timing at which the clock signal clk6 is received and provides the correction coefficient Dcf to the correction calculating circuit 141. Here, when the integrating capacitance circuit 121 has selected an integrating capacitance value in keeping with a relationship between the cycle information and the integrating capacitance value like that depicted in FIG. 19A, the correction coefficient circuit 142 also selects a correction coefficient in keeping with a relationship between the cycle information and the correction coefficient like that depicted in FIG. 19B. As one example, as depicted in FIG. 17B, when the integrating capacitance circuit 121 has selected the capacitor C3, the correction coefficient circuit 142 selects the correction coefficient Dcf3.

The operation and effect of the control circuit of the switching power supply device according to the third embodiment are the same as the operation and effect of the control circuit of the switching power supply device according to the second embodiment.

In the embodiments described above, although correction according to a signal corresponding to the input voltage is performed by the correction calculating unit 44 for the estimated load current value, correction may be performed for the set value of the overload setting unit 52 that is to be compared with the estimated load current value. Also, although a configuration where the resistor Rs or the capacitance Cf that decides the integration gain is variable is used in the second and third embodiments, it is also possible to use a configuration where both the resistor Rs and the capacitance Cf are variable. In addition, although a configuration where the integrating resistance circuit 91 and the integrating capacitance circuit 121 select one out of a plurality of resistors or capacitors is used, it is also possible to select a combined value of two or more resistors and capacitors.

Since the control circuit of the switching power supply device of the above configuration locally has information on input voltages to achieve worldwide compatibility, there is the advantage that input terminals or additional external components for detecting the input voltages are not needed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control circuit of a current resonance-type switching power supply device, comprising:
   a first input terminal configured to receive an error voltage between an output voltage and a target voltage;
   a first analog-to-digital (A/D) converter configured to convert the error voltage to digital;
   a switching cycle generating unit configured to generate a driving signal of a switching element with a cycle in keeping with an output signal of the first A/D converter;
   a second input terminal configured to receive a signal corresponding to a resonant current;
   an integrator configured to integrate the signal inputted into the second input terminal;
   a second A/D converter configured to convert an output signal of the integrator to digital;
   an averaging calculation unit configured to divide an output signal of the second A/D converter by the output signal of the first A/D converter;
   a correction calculating unit configured to correct an output signal of the averaging calculation unit using the output signal of the first A/D converter and output an estimated load current value in keeping with a plurality of different input voltages; and
   a clock generating unit configured to generate a clock signal to be inputted into the first A/D converter, the integrator, the second A/D converter, the averaging calculation unit, and the correction calculating unit.

2. The control circuit of a current resonance-type switching power supply device according to claim 1,
   wherein the control circuit is disposed on a primary side of the current resonance-type switching power supply device,
   the first input terminal is connected via an insulating element to an error amplifier that outputs an error between the output voltage on a secondary side and the target voltage, and
   a signal produced by shunting the resonant current on the primary side and converting to a voltage is inputted into the second input terminal.

3. The control circuit of a current resonance-type switching power supply device according to claim 1, further comprising an overload protection unit configured to compare the estimated load current value outputted by the correction calculating unit with an overload set value, and output a signal that stops switching of the switching element when the estimated load current value exceeds the overload set value.

4. The control circuit of a current resonance-type switching power supply device according to claim 1,
wherein an integration period of the integrator is controlled by a first clock signal outputted from the clock generating unit and the integration period according to the first clock signal is half a cycle of the driving signal outputted from the switching cycle generating unit.

5. The control circuit of a current resonance-type switching power supply device according to claim 2,
wherein the integrator switches gain in keeping with cycle information in an output signal of the first A/D converter, and
the correction calculating unit corrects the output signal of the averaging calculation unit using a correction coefficient value corresponding to the gain to which the integrator has switched.

6. The control circuit of a current resonance-type switching power supply device according to claim 5,
wherein switching of the gain of the integrator and switching of the correction coefficient value of the correction calculating unit are performed in a period where the integrator is not performing an integration operation.

7. The control circuit of a current resonance-type switching power supply device according to claim 5,
wherein the gain of the integrator is smaller the longer a cycle corresponding to the cycle information and is larger the shorter the cycle corresponding to the cycle information.

8. The control circuit of a current resonance-type switching power supply device according to claim 5,
wherein the integrator includes an integrating resistance circuit whose resistance value is switched in keeping with a cycle corresponding to the cycle information, and
the correction calculating unit has a correction coefficient circuit for which the correction coefficient value is switched in keeping with the cycle corresponding to the cycle information.

9. The control circuit of a current resonance-type switching power supply device according to claim 5,
wherein the integrator includes an integrating capacitance circuit whose capacitance value is switched in keeping with a cycle corresponding to the cycle information, and
the correction calculating unit has a correction coefficient circuit for which the correction coefficient value is switched in keeping with the cycle corresponding to the cycle information.

* * * * *